(12) United States Patent
Marquezan et al.

(10) Patent No.: US 12,177,075 B2
(45) Date of Patent: Dec. 24, 2024

(54) NETWORK ENTITIES FOR SUPPORTING ANALYTICS GENERATION IN A MOBILE NETWORK

(71) Applicant: Huawei Technologies Co., Ltd., Shenzhen (CN)

(72) Inventors: Clarissa Marquezan, Munich (DE); Riccardo Trivisonno, Munich (DE); Qing Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/856,669

(22) Filed: Jul. 1, 2022

(65) Prior Publication Data
US 2022/0353145 A1 Nov. 3, 2022

Related U.S. Application Data

(63) Continuation of application No. PCT/EP2020/050108, filed on Jan. 3, 2020.

(51) Int. Cl.
*H04L 41/0853* (2022.01)
*H04L 41/082* (2022.01)
(Continued)

(52) U.S. Cl.
CPC ........ *H04L 41/0853* (2013.01); *H04L 41/082* (2013.01); *H04L 41/0895* (2022.05);
(Continued)

(58) Field of Classification Search
CPC ............... H04L 41/0853; H04L 41/122; H04L 41/0895; H04L 41/082; H04L 43/20; H04W 4/021; H04W 60/04
See application file for complete search history.

(56) References Cited

U.S. PATENT DOCUMENTS

| | | | |
|---|---|---|---|
| 7,308,237 B2 | 12/2007 | Kokkonen et al. | |
| 2010/0273491 A1* | 10/2010 | Colonna | G08G 1/0104 455/456.3 |

(Continued)

FOREIGN PATENT DOCUMENTS

| | | |
|---|---|---|
| CN | 110583034 A | 12/2019 |
| EP | 1924114 B1 | 11/2015 |
| WO | 2019197426 A1 | 10/2019 |

OTHER PUBLICATIONS

Verizon UK Ltd., et al., "Increasing efficiency of data collection," 3GPP TSG SA WG2 Meeting #136, Reno, USA, S2-1912658 (Revision of S2-1912635), total 4 pages, 3rd Generation Partnership Project, Valbonne, France (Nov. 18-22, 2019).

(Continued)

*Primary Examiner* — Viet D Vu
(74) *Attorney, Agent, or Firm* — Leydig, Voit & Mayer, Ltd.

(57) ABSTRACT

Analytics information is generated in a new generation mobile network. A first network entity generates the analytics information, and a second network entity and a third network entity support the analytics generation. The first network entity is configured to obtain, from the second network entity or from one or more third network entities, past and/or current association information for an area of interest. Further, it is configured to provide analytics information based on the obtained association information for the area of interest. The past and/or current association information indicates one or more other network entities and/or network properties that, respectively, have been and/or are mapped to or serving the area of interest.

21 Claims, 12 Drawing Sheets

(51) Int. Cl.
    *H04L 41/0895*     (2022.01)
    *H04L 41/122*     (2022.01)
    *H04L 43/20*     (2022.01)
    *H04W 4/021*     (2018.01)
    *H04W 60/04*     (2009.01)

(52) U.S. Cl.
    CPC ............ *H04L 41/122* (2022.05); *H04L 43/20* (2022.05); *H04W 4/021* (2013.01); *H04W 60/04* (2013.01)

(56) References Cited

U.S. PATENT DOCUMENTS

| | | | | |
|---|---|---|---|---|
| 2016/0092333 | A1* | 3/2016 | Liu | G06F 16/119 |
| | | | | 702/186 |
| 2016/0212633 | A1* | 7/2016 | Flanagan | H04W 4/02 |
| 2019/0222489 | A1 | 7/2019 | Shan | |
| 2019/0379734 | A1 | 12/2019 | Zavesky et al. | |
| 2020/0112921 | A1* | 4/2020 | Han | H04W 24/02 |
| 2020/0322775 | A1* | 10/2020 | Lee | H04W 8/02 |
| 2021/0014141 | A1* | 1/2021 | Patil | H04W 76/25 |
| 2021/0329485 | A1* | 10/2021 | Han | H04W 28/0236 |

OTHER PUBLICATIONS

"3rd Generation Partnership Project; Technical Specification Group Services and System Aspects; System architecture for the 5G System (5GS); Stage 2 (Release 16)," 3GPP TS 23.501 V16.3.0, total 417 pages, 3rd Generation Partnership Project, Valbonne, France (Dec. 2019).

"3rd Generation Partnership Project; Technical Specification Group Services and System Aspects; Study of Enablers for Network Automation for 5G (Release 16)," 3GPP TR 23.791 V16.0.0, total 121 pages, 3rd Generation Partnership Project, Valbonne, France (Dec. 2018).

"3rd Generation Partnership Project; Technical Specification Group Services and System Aspects; Architecture enhancements for 5G System (5GS) to support network data analytics services (Release 16)," 3GPP TS 23.288 V16.2.0, total 57 pages, 3rd Generation Partnership Project, Valbonne, France (Dec. 2019).

"3rd Generation Partnership Project; Technical Specification Group Services and System Aspects; Study on Enablers for Network Automation for 5G—phase 2 (Release 17)," 3GPP TR 23.700-91 V0.2.0, total 19 pages, 3rd Generation Partnership Project, Valbonne, France (Dec. 2019).

"3rd Generation Partnership Project; Technical Specification Group Services and System Aspects; Procedures for the 5G System (5GS); Stage 2 (Release 16)," 3GPP TS 23.502 V16.3.0, total 558 pages, 3rd Generation Partnership Project, Valbonne, France (Dec. 2019).

"3rd Generation Partnership Project; Technical Specification Group Services and System Aspects; Procedures for the 5G System; Stage 2 (Release 15)," 3GPP TS 23.502 V15.3.0, total 330 pages, 3rd Generation Partnership Project, Valbonne, France (Sep. 2018).

"3rd Generation Partnership Project; Technical Specification Group Core Network and Terminals; 5G System; Usage of the Unified Data Repository service for Policy Data, Application Data and Structured Data for Exposure; Stage 3 (Release 16)," 3GPP TS 29.519 V16.2.0, total 142 pages, 3rd Generation Partnership Project, Valbonne, France (Dec. 2019).

"3rd Generation Partnership Project; Technical Specification Group Services and System Aspects; System Architecture for the 5G System; Stage 2 (Release 15)," 3GPP TS 23.501 V15.3.0, total 226 pages, 3rd Generation Partnership Project, Valbonne, France (Sep. 2018).

"3rd Generation Partnership Project; Technical Specification Group Core Network and Terminals; 5G System; Usage of the Unified Data Repository services for Subscription Data; Stage 3 (Release 16)," 3GPP TS 29.505 V16.1.0, total 135 pages, 3rd Generation Partnership Project, Valbonne, France (Dec. 2019).

Orange, "NF instance discovery," 3GPP TSG-SA WG2 Meeting #133, S2-1906151, Reno, USA, Total 3 pages, 3rd Generation Partnership Partner, Valbonne, France (May 13-17, 2019).

Shin et al., "Trends of 5G Network Automation and Intelligence Technologies Standardization," 2019 Electronics and Telecommunications Trends, vol. 34, No. 2, Total 18 pages, ETRI (Apr. 2019). With an English Abstract and Machine Translated by Google.

* cited by examiner

1100

1101 — Obtaining past and/or current association information for an area of interest, in response to a first request sand/or according to a first subscription.

1102 — Obtain change information upon lifecycle changes in one or more target elements related to the association information, the one or more target elements being a network entity or a network property

1201 — Provide past and/or current association information for an area of interest, in response to a request and/or according to a subscription.

1202 — Provide association information, upon changes in one or more target elements related to the association information, the one or more target elements being a network entity or a network property

FIG. 12

NETWORK ENTITIES FOR SUPPORTING ANALYTICS GENERATION IN A MOBILE NETWORK

CROSS-REFERENCE TO RELATED APPLICATIONS

This application is a continuation of International Application No. PCT/EP2020/050108, filed on Jan. 3, 2020, the disclosure of which is hereby incorporated by reference in its entirety.

TECHNICAL FIELD

The present disclosure relates to a new generation mobile network, and particularly to the generation of analytics information in the network. To this end, the disclosure provides network entities and corresponding methods, which support the analytics generation. For instance, the network entities and methods facilitate the gathering of information usable for the analytics generation.

BACKGROUND

FIG. 1 illustrates an example of a possible mobile network architecture, in which embodiments of the invention can be applied. FIG. 1 particularly illustrates a mobile network based on the 5G architecture, as per 3GPP TS 23.501 specification. FIG. 1 shows the separation among: Management Plane (MP), Control Plane (CP), and User Plane (UP). Further, its shows the separation among the Access Network (AN), Core Network (CN), and Data Network (DN).

The mobile operator can deploy and manage, via the MP, different network slices. The MP configures and manages the resources and entities associated with the network slice in both ANs and CNs. Each network slice is associated to CP and UP entities, i.e., the entities belong to the same network slice. For simplicity, FIG. 1 illustrates only one network slice, which is identified by Single Network Slice Selection Assistance Information (S-NSSAI) #1 with its associated CP and UP entities. The CP entities of the mobile operator network manage the connections of User Equipment (UE) from AN to the DN. Eventually it is also possible that external CP (e.g., Application Functions (AF)) from external entities can also interact with the mobile operator CP entities, while the UP entities are the ones actually transmitting the data traffic related to the UEs and applying the control actions/policies defined by the CP entities.

The Network Data Analytics Function (NWDAF) is a Network Function (NF) in 5G systems, which is able to generate analytics information for specific UEs and/or groups of UEs and/or for an "area of interest" (e.g., a list of Tracking Areas (TAs), and/or cell Identifications (ID(s)). In order to generate such analytics information, the NWDAF collects information about 5GS entities that were and/or are related to the UEs and/or to the "area of interest" indicated in the request for the analytics information. Examples of such a relationship are: NFs serving an UE (e.g., Access and Mobility Management Function (AMF) controlling UEs connections to AN); NFs and/or UEs and/or AFs and/or cells serving in or belonging to a given area of interest.

SUMMARY

With the current 3GPP specification TS 23.288, TS 23.501, TS 23.502, the NWDAF has minimal mechanisms to identify the UE x CP NFs association. If the NWDAF requires information about NFs and/or UEs and/or cells, and/or TA, and/or network slices (e.g., s(S-NSSAI or Network Slice Instance (NSI)) that were/are serving an area of interest at the present time or in the past (e.g., a month ago) the current mechanism fails to provide such info.

There are already mechanisms in 5GS to store information at a Unified Data Repository (UDR) about events that NFs can expose. This is defined in TS 23.502 Clause 4.15.3.2.4, where the Network Exposure Function (NEF) is configured to subscribe to events from NFs, and to invoke the UDR services for storing the events, as per TS 23.502 Clause 5.2.12.2.1. In this case, the NEF uses the data set identifier as "Exposure Data" to create the records in UDR related to access and mobility information, as well as session management information (further defined in TS 23.502 Clause 5.2.12.1) including a timestamp to the created records, as defined I TS 23.502 Clause 5.2.12.1.

However, limitations currently in 5GS to retrieve historical record from UDR are:
- There is no mechanism to search UDR stored information per "area of interest", which would enable the NWDAF to identify all the UEs and/or NFs (if the information were available) in a given "area of interest" with a single search, and not having to retrieve/subscribe to information per UE, which significantly increases the load of data collection.
- There is no information about which NFs were associated with the events about UEs or Protocol Data Unit (PDU) sessions stored at the UDR. This means that when the NWDAF retrieves the events and determines the location of the UEs, the NWDAF still has to search some other entity in the network (e.g., Unified Data Management (UDM)) to determine which NFs are serving the UE. This information is incomplete, because the UDM provides only the current NFs serving the UEs, but no historical information. In addition, using such mechanisms would lead to a significant increase in data collection.
- There are no mechanisms to query the dataset identifiers, specifically the "Exposure Data", based on, for example, an interval of timestamps and an area of interest and/or UEs identification and/or network slice identification.

On the other hand, 5GS has the UDM NF that is capable of providing the NFs that are serving a given UE. However, the UDM NF has the following limitations:
- Event exposure of the UDM does not provide any information about changes in the NFs serving a UE (e.g., Session Management Function (SMF), Policy Control Function (PCF), or AMF).
- The UE context service offers only the possibility to search UDM per "UE ID, NF Type, and Access Type" (as defined in TS 23.502 Clause 5.2.3.2.4).

Therefore, there is also no mechanism in the UDM to search stored information per "area of interest", nor is there any mechanism to keep the historical information of 5GS serving an area of interest.

3GPP TS 23.288 specifies in Clause 6.2.2.1 mechanisms that define the NF services that need to be consumed by the NWDAF, in order to determine, which NFs are serving UEs. However, there is no definition on how the NWDAF can determine historical (past) and/or actual (current) 5GS entities serving area of interest.

3GPP specification TS 28 series on management defines the Operation, Administration and Maintenance (OAM) services for collecting information such as provisioning information (current association among network slice entities), fault information, performance information. These specifications do not offer any service for collection of historical association among NFs and UEs; nor about network information per area of interest.

In view of the above-mentioned problems and disadvantages, embodiments of the present invention aim to provide an improved mechanism for data collection for generating analytics information.

An objective is to provide network entities and methods, which can support the analytics generation with an enhanced data collection.

In particular, a goal is to determine past and/or current association information for an area of interest, e.g. past and/or current 5GS entities serving the area of interest. Thereby, a load of the data collection should be minimized.

A first aspect of this disclosure provides a network entity for analytics generation of a mobile network, the first network entity being configured to: obtain, from a second network entity or from one or more third network entities, past and/or current association information for an area of interest, wherein the past and/or current association information indicates one or more other network entities and/or network properties that, respectively, have been and/or are mapped to or serving the area of interest; and provide analytics information, the analytics information being based on the obtained association information for the area of interest.

The network entity of the first aspect can acquire the association information, in order to generate the analytics information. In particular, the network entity can obtain this association information with reduced signalling, and thus with reduced load. Accordingly, the network entity supports an enhanced analytics generation.

In an implementation form of the first aspect, the first network entity is configured to: send a request and/or subscribe for association information for an area of interest to the second network entity or to the one or more third network entities; and obtain the association information for an area of interest and/or area of interest transaction identification from the second network entity or from the one or more third network entities, in response to the request and/or according to the subscription.

The first network entity can directly consume the association information for generating the analytics information from the one or more second and/or third network entities. The first network entity may be configured to contact different types of second and/or third network entities (e.g., different types of NFs) for the association information. The first network entity has thus great flexibility to obtain the desired association information, while keeping the network load low.

In an implementation form of the first aspect, the request and/or the subscription for association information for an area of interest, comprises at least one of: target area of interest, the target are of interest being the spatial area related to the mobile network, from where the first network entity requires the past and/or current association information for the target area of interest; target type of the one or more other network entities and/or network properties, wherein the target type of entity and/or property describes the type of entity or property that should be identified as mapped to or serving the target area of interest; area of interest transaction identifier; identification of the first network entity; temporal interval, the temporal interval being the time window to be used for the selection of the one or more entities and/or properties mapped to or serving the target area of interest.

In an implementation form of the first aspect, the area of interest transaction identification comprising at least one of: an updated area of interest transaction identification indicating changes in association information for an area of interest; non modified area of interest transaction identification indicating no changes association information for an area of interest.

In an implementation form of the first aspect, the target type of the network entities and/or network properties comprises at least one of: UE type; Cell type; TA type; NF Type; Network slice type; External entity type; Application type; Session type; Quality of Service (QoS) profile type; DN type; Public land mobile network (PLMN) type.

In an implementation form of the first aspect, the first network entity is configured to: send a plurality of requests and/or subscribe for association information for an area of interest to a plurality of third network entities; obtain the association information for an area of interest from the plurality of third network entities, in response to the plurality of requests and/or according to the subscriptions for association information for an area of interest; aggregate the obtained association information; and provide the analytics information, the analytics information being based on the aggregated association information.

In an implementation form of the first aspect, the first network entity is configured to: send a request and/or subscribe for association information for an area of interest to the second network entity; obtain the association information for an area of interest and/or area of interest transaction identification from the second network entity, in response to the request and/or according to the subscription for association information for an area of interest; and provide the analytics information, the analytics information being based on the obtained association information.

The first network entity can, for example, obtain the association information from one dedicated network entity, e.g. NF, which may also be referred to as an intermediary network entity, since the second network entity may gather that association information from third network entities. For the first network entity, this is a very efficient option to obtain the association information it needs.

In an implementation form of the first aspect, the first network entity is configured to: determine, from the obtained association information for an area of interest, the one or more other network entities and/or network properties mapped to or serving the area of interest, select and/or obtain data from the determined one or more other network entities and/or network properties, and provide analytics information, the analytics information being based on the selected and/or obtained data.

In an implementation form of the first aspect, the first network entity is a control plane entity, in particular comprising a NWDAF.

A second aspect of this disclosure provides a second network entity for supporting analytics generation of a mobile network, the second network entity being configured to: obtain past and/or current association information for an area of interest from one or more third network entities, in response to a first request sent to and/or according to a first subscription to the one or more third network entities; wherein the past and/or current association information indicates one or more other network entities and/or network properties that, respectively, have been and/or are mapped to or serving the area of interest; and/or obtain change information from one or more third network entities, upon lifecycle changes in one or more network entities and/or network properties related to the association information provided by one or more third network entities.

The second network entity supports the analytic generation by gathering and maintaining the association information. It can then provide the association information for generating the analytics information, for instance, to the first network entity. In particular, the second network entity supports data collection for the analytics generation, including new information that was not previously available to the analytics generation, with significantly reduced load. The significantly reduced load can be particularly achieved when the second network entity obtains change information instead of full association information.

In an implementation form of the second aspect, the first request sent to and/or first subscription comprises the target area of interest, the target area of interest being the spatial area related to the mobile network, from where the second network entity requires the past and/or current association information for the target area of interest.

In an implementation form of the second aspect, the second network entity is configured to: aggregate the obtained association information for an area of interest.

The second network entity may provide the aggregated association information to the first network entity. The first network entity generating the analytics information can thus perform the generation more efficiently and faster based on the already pre-processed association information.

In an implementation form of the second aspect, the second network entity is further configured to: obtain a second request and/or a second subscription for association information of an area of interest, from a first network entity; and provide the obtained association information and/or aggregated association information for an area of interest to the first network entity, in response to the second request and/or according to the second subscription.

Accordingly, the second network entity can provide the association information, which it collected from one or more other network entities to the first network entity. The second network entity can thus act as intermediary network entity (e.g., intermediary NF) between the first network entity and third or other network entities.

In an implementation form of the second aspect, the second network entity is configured to: obtain or generate an area of interest transaction identification for the area of interest, and provide the obtained association information and/or the aggregated association information for an area of interest and/or area of interest transaction identification to the first network entity.

In an implementation form of the second aspect, the second network entity is further configured to: obtain change information from one or more third network entities, wherein the change information indicates a change in a lifecycle of the one or more other network entities and/or network properties; update the association information based on the change information; and provide the updated association information and/or aggregated updated association information to the first network entity.

In an implementation form of the second aspect, the second request and/or the second subscription for association information of an area of interest comprises at least one of: target type of the one or more other network entities and/or network properties, wherein the target type of entity and/or property describes the type of entity or property that should be identified as mapped to or serving the target area of interest; area of interest transaction identifier; identification of the first network entity; temporal interval, the temporal interval being the time window to be used for the selection of the one or more entities and/or properties mapped to or serving the target area of interest.

In an implementation form of the second aspect, the second network entity is a control plane entity, in particular comprising a UDM and/or UDR and/or NWDAF.

A third aspect of this disclosure provides a third network entity for supporting analytics generation, the third network entity being configured to: provide past and/or current association information for an area of interest to a first network entity and/or to a second network entity, in response to a request received from and/or according to a subscription from the first network entity and/or from the second network entity; wherein the past and/or current association information indicates one or more other network entities and/or network properties that, respectively, have been and/or mapped to or serving the area of interest, and/or provide association information to a first network entity and/or to a second network entity, upon changes in one or more target elements related to the association information, the one or more target elements being a network entity or a network property.

The third network entity can support the analytic generation by providing the association information, for instance, to the first network entity. In particular, the third network entity can support data collection for the analytics generation based on information that is, of today, not available to analytics generation.

In an implementation form of the third aspect, the request received from and/or according to a subscription from the first network entity and/or from the second network entity comprises at least one of: target area of interest, the target are of interest being the spatial area related to the mobile network, from where the first network entity requires the past and/or current association information for the target area of interest; target type of the one or more other network entities and/or network properties, wherein the target type of entity and/or property describes the type of entity or property that should be identified as mapped to or serving the target area of interest; area of interest transaction identifier; identification of the first network entity; temporal interval, the temporal interval being the time window to be used for the selection of the one or more entities and/or properties mapped to or serving the target area of interest.

In an implementation form of the third aspect, the third network entity is a control plane NF, in particular comprising a SMF and/or AMF and/or a network slice selection function (NSSF) and/or NEF and/or application function (AF) and/or NRF.

A fourth aspect of this disclosure provides a network entity, wherein the network entity is the first network entity according to the first aspect, or the second network entity according to the second aspect, or the third network entity according to the third aspect wherein: the association information and/or aggregated association information for an area of interest, comprises at least one of: one or more UE identification and/or UE group identification mapped to or serving the area of interest; one or more Cell identification mapped to or serving the area of interest; one or more tracking area identification mapped to or serving the area of interest; one or more network slice identification mapped to or serving the area of interest; one or more NF identification mapped to or serving the area of interest; one or more NF Set identification mapped to or serving the area of interest; one or more external entity identification mapped to or serving the area of interest; one or more Application identification mapped to or serving the area of interest; one or more session identification mapped to or serving the area of interest; one or more QoS profile identification mapped to or serving the area of interest; one or more data network identification mapped to or serving the area of interest; one or more PLMN identification mapped to or serving the area of interest.

A fifth aspect of this disclosure provides a method for analytics generation for a first network entity, the method comprising: obtaining, from a second network entity or from one or more third network entities, past and/or current association information for an area of interest, wherein the past and/or current association information indicates one or more other network entities and/or network properties that, respectively, have been and/or are mapped to or serving the area of interest, and providing analytics information, the analytics information being based on the obtained association information.

The method of the fifth aspect can have implementation forms that correspond to the implementation forms of the first network entity of the first aspect. Accordingly, the method of the fifth aspect and its possible implementation forms achieve the same advantages and effects as the first network entity of the first aspect and its respective implementation forms.

A sixth aspect of this disclosure provides a method for supporting analytics generation for a second network entity, the method comprising: obtaining past and/or current association information for an area of interest from one or more third network entities, in response to a first request sent to and/or according to a first subscription to the one or more third network entities; wherein the past and/or current association information indicates one or more other network entities and/or network properties that, respectively, have been and/or are mapped to or serving the area of interest; and/or obtaining change information from one or more third network entities, upon lifecycle changes in one or more network entities and/or network properties related to the association information provided by the one or more third network entities.

The method of the sixth aspect can have implementation forms that correspond to the implementation forms of the second network entity of the second aspect. Accordingly, the method of the sixth aspect and its possible implementation forms achieve the same advantages and effects as the second network entity of the second aspect and its respective implementation forms.

A seventh aspect of this disclosure provides a method for supporting analytics generation for a third network entity, the method comprising: providing past and/or current association information for an area of interest to a first network entity and/or a second network entity, in response to a request received from and/or according to a subscription from the first network entity and/or the second network entity; wherein the past and/or current association information indicates one or more other network entities and/or network properties that, respectively, have been and/or are mapped to or serving the area of interest, and/or providing association information to a first network entity and/or a second network entity, upon changes in one or more target elements related to the association information, the one or more target elements being a network entity or a network property.

The method of the seventh aspect can have implementation forms that correspond to the implementation forms of the third network entity of the third aspect. Accordingly, the method of the seventh aspect and its possible implementation forms achieve the same advantages and effects as the third network entity of the third aspect and its respective implementation forms.

An eighth aspect of this disclosure provides a computer program comprising a program code for performing the method according to one of the fifth, sixth or seventh aspect, or any of its implementation forms, when executed on a computer.

A ninth aspect of the present disclosure provides a non-transitory storage medium storing executable program code which, when executed by a processor, causes the method according to the fifth, sixth or seventh aspect, or any of its implementation forms, to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

DEFINITIONS

In the following, some terms used in this document are generally defined.

Area of interest: The area of interest defines a spatial and/or location area, for instance, in any of the terms below:
  Access network cells (e.g., identified by cell ID(s)).
  Access network TA level (e.g., identified by a list of TA identifiers (TAI(s)), or a range of TAIs).
  Geodetic uncertainty shapes (e.g. polygons, circles, etc.).
  Civic addresses (e.g. streets, districts, etc.).
  Datacenter locations.
  Network slice locations (e.g., regions such as City A and City B of a network slice S-NSSAIs).
  Operator network locations (e.g., operator A in country X, and operator A in country Y).

Network Entities and/or Network Properties (also referenced as 5GS entities and 5GS properties): These are entities or properties (hardware, software, concepts) that are part of mobile network systems, i.e., hardware and/or software and/or concepts that are part of the mobile operator network and/or mobile network architecture. Examples of types of network entities and network properties are:
  UE(s) that can be controlled by an operator network.
  Cell at the access network, e.g., NR and or eNB.
  TA, a concept that defines the cells that are classified as belonging to the same group.
  Network slice, which uniquely defines a network slice deployed by an operator. Examples of how network slices are identified, are via Network Slice Selection assistance Information (NSSAI) and/or S-NSSAI and/or NSI.
  NF, is the processing function in a network, which has defined functional behavior and defined interfaces and/or reference points. Examples of NFs are: UDM, AMF, UDR, and AF.

Network function set, is a group of NFs of the same NF type that can be interchanged for supporting the same service in a network slice.

External AF: Defines an AF that is not trusted by the mobile operator. For instance, a 3rd party AF is an external AF.

Application: defines some specific type of traffic and can be defined by an application ID (which can be mapped to a specific application traffic detection rule).

Session: is the association between a UE and a DN for transmitting data traffic to and/or the UE, enabling service connectivity.

QoS profile: defines the quality of service properties of a UE communication.

DN: is the network outside the mobile operator network where UE traffic is sent to and/or from:

PLMN, comprises the unique identification of a mobile operator offering communication services in a mobile communication network.

Network entity or network property serving an area of interest: The term "serving" defines the network entity and/or network property relationship with the area of interest (e.g., 5GS entity mapped to the area of interest). For instance, if the network entity or network property is of the following type(s):

UE: the term "serving" denotes an UE that is located in an area of interest.

Cell: the term "serving" denotes a cell that belongs to an area of interest.

TA: the term "serving" denotes the TA(s) that belong to an area of interest.

Network slice: the term "serving" denotes the network slices (e.g., S-NSSAIs, NSI, NSSAI) that are available (i.e., that UEs can use) in an area of interest.

NF: the term "serving" denotes an NF that is related to a UEs activities (e.g., mobility, session establishment, data transmission) and/or CP activities (e.g., storing information, providing analytics, managing subscription information, handling exposure of information, allowing discovery of NFs) in the area of interest. For instance, AMF controls UE mobility, SMF controls session management, PCF controls policies, AF influencing traffic, BSF controls the mapping of UEs to PCFs, UPF transmitting the data traffic to and/or from UE, etc.

NF set: the term "serving" denotes an NF Set that is located in an area of interest.

External AF: the term "serving" denotes the AFs that are related to UEs in an area of interest (e.g., AF communicating with UEs via Non-IP Data Delivery model, external AFs influencing traffic of UEs).

Application: the term "serving" denotes the application that are being used in the mobile network in an area of interest.

Session: the term "serving" denotes one or more sessions that are located in an area of interest. The 5G Entity session type can be further typified according to its PDU session types (e.g., IPv4, IPv6, IPv4v6, Ethernet, and Unstructured) and/or SSC type (Session and Service Continuity, e.g., as defined in 3GPP TS 23.501, SSC Mode 1, SSC Mode 2, SSC Mode 3).

QoS Profile: the term "serving" denotes one or more QoS profile that are being used for data traffic communication of UEs (for instance in UE's PDU sessions), where the UE is located in the area of interest.

Data network: the term "serving" denotes one or more data networks that are to UL and/or DL data traffic and/or control plane traffic between the mobile operation network and the data network outside the mobile operator network. For instance, data network serving an area of interest are all DNNs that are receiving and/or sending UL and/or DL traffic related to UEs and/or receiving or sending traffic to CP NFs, where UEs and/or NFs are located in the target area of interest.

PLMN: the term "serving" denotes one or more PLMN that are associated with the data traffic from and/or to UE and/or traffic among NFs, where the UEs and/or the NFs are located in the target area of interest.

Information about network entities and/or network properties serving in area of interest: is the actual values and/or a list of values (or instances) for a given type of network entity and/or network property related to/serving/mapped to area(s) of interest. For instance, if the type of network entity or network property is of the ones listed below, the information about network entities or network properties serving in the area of interest are:

For UE Type of 5GS Entity: one or more UE identification (e.g., SUPI, GPSI, 5G-GUTI, UE IP address, among other) and/or UE group identification (e.g., Internal Group Identifier(s), External Group Identifier).

For Cell Type of 5GS Entity: one or more Cell identification (e.g., Cell ID, NG-RAN node ID).

TA Type of 5GS Entity: one or more TAI(s) (e.g., 3GPP TAI, non-3GPP TAI)

For Network slice Type of 5GS Entity: one or more network slice identification (e.g., NSSAI(s) and/or S-NSSAIs and/or NSI(s)).

For NF Type of 5GS Entity: one or more NF identification (e.g. NF ID).

Network Function (NF) set: one or more NF set identification.

For External AF Type of 5GS Entity: one or more external AF identification (e.g., AF ID).

For Application Type of 5GS Entity: Application identification (e.g., Application ID, AF transaction internal ID, Sponsor Identity, Background Data Transfer Reference ID).

For Session Type of 5GS Entity: one or more PDU session ID and/or PDU session type, and/or SSC mode.

For QoS profile Type of 5GS Entity: one or more identification of QoS Profile (e.g., 5QI identification).

For Data network Type of 5GS Entity: one or more DNN and/or DNAI

For PLMN information Type of 5GS Entity: one or more identification of PLMN (e.g., home or visiting PLMN ID).

Analytics Function: is an NF that receives a request and/or subscription to an analytics information from a consumer and can perform analytics information generation. An example of an analytics function is the NWDAF of 3GPP 5G Architecture defined in TS 23.501.

Analytics information: is the output of an analytics functions, for instance an analytics ID as defined in 3GPP TS 23.288, such as the analytics IDs listed in Clauses 6.4-6.9 in TS 23.288 V16.1.0.

Enhanced NF Centralizing information on 5GS entities (aka, network entities and/or network properties) serving area(s) of interest: is capable to provide information about 5GS entity serving in area(s) of interest for any and/or all types of 5GS entity.

Entity detecting 5GS entities (aka, network entities and/or network properties) serving area(s) of interest: is capable to provide information about 5GS entity serving in area(s) of interest for a specialized and/or subset of types of 5GS Entity.

Source of Data Collection: Is a 5GS entity capable to provide raw data to be used for analytics information generation.

Determined sources of data collection: is a 5GS entity related to the information about 5GS Entities serving in area(s) of interest. For instance, it is an 5GS entity (e.g., NF instance) that is included in the list of information about 5GS Entities serving in area(s) of interest, e.g., in the following list: ({TA1:NF #a, NF #b}, {TA2:NF #c}, TA3:NF #d, NF #e}). In this sense, each NF instance included in such list is a determined source of data collection.

Raw data: is a measurement, metric, event, data file, monitoring information, logs, among other formats of data that can be retrieve.

Analytics information generation: it is a process in which the Analytics Function uses raw data to perform calculations and/or applies statistical analysis, and/or applies ML/AI techniques (such as regression models, neural networks, etc.) to produce analytics information.

Search criteria: is a parameter to describe specific characteristics on the data that needs to be queried/retrieved/provided related to information about 5GS Entity serving in area(s) of interest. Examples of the specific characteristics of a search criteria are any of the listed below:

Temporal aspects (e.g., interval of time associated with the historical records).

Quantitative aspects (e.g., number of results, such as last 20 historical stored information).

Control of the lifecycle of 5GS entities: is related to capability of changing the 5GS entity from one to another stage and/or configuration. For instance, a stage can be 5GS entity is deployed (e.g., in case of network slice), or instantiated (e.g., in case of NF), or established (e.g., in case of session), or connected (e.g., in case of UE, or application, or data network). The entity that has the capability to change the stage of a 5GS Entity, e.g., disconnect UE by deregistering the UE from the network, is the entity that can control the lifecycle of such 5GS Entity. In the case of configuration, an example of the capacity of changing a configuration is for instance: a PDU session configured with QoE profile 5QI 1, and is then changed to 5QI 2.

Lifecycle changes of 5GS entity (e.g., network entity and/or network property): is information related to lifecycle changes of the 5GS entity and/or property. Examples of lifecycle changes of a 5GS entity and/or property are:

Changes on UE context, which can be caused by changes in
  UE location; established sessions; type of established sessions; new data networks being used by established sessions; In the UE context example, lifecycle change of the UE 5GS Entity is that the UE Location information changed from one area of interest to another area of interest.
Changes in NF profiles, which can reflect new NFs and/or Network Slices added into an area of interest or NFs and/or Network slices removed from an area of interest.
Changes in DNNs used for UE sessions, which can reflect in Data Network added or removed from an area of interest.

Area of interest transaction identifier: uniquely identify a set of 5GS entities (aka, network entity and/or network property) serving an area of interest within an interval of time. This transaction identifier enables that information about 5GS entities serving an area of interest that has not been changed due to 5GS entities lifecycle changes, will not be exchanged between the entities of this invention. This guarantees that only information of 5GS entities serving an area of interest that was not yet obtained by the analytics function, or that have changed since the last time the analytics function obtained such information, will be actually transmitted among the entities of this invention. The use of such information allows the reduction of load of data collection.

Data set identifier: Following the same definition in TS 23.501 Clause 5.2.12.2.1: "uniquely identifies a set of data" within CP NF #2". Examples of data set identifiers are Subscription Data, Policy Data, and Application data, Exposure Data. Another example of description of data set identifier is provided in TS 23.502 in the definition of the type of data used by UDM, for instance the data type mentioned in TS 23.502, Table 5.2.3.3.1-3, where the subscription data types are examples of a list of uniquely identified sets of data, such as Access and Mobility Subscription data, SMF Selection Subscription data, Session Management Subscription data. In these cases listed in the UDM, the data set identifier might be the exact name of the data set.

Data subset identifier: Following the same definition in TS 23.501 Clause 5.2.12.2.1: "uniquely identifies the data subset within a data set. For instance, if we consider the organization of data in UDR, examples of subset data identifiers are: Access and Mobility Subscription data, Policy Set Entry data, Background Data Transfer data, Access and Mobility Information, UE context in SMF data.

Data set key and data sub key: is the information used for identify values that distinguish one specific data set and/or data sub-set from each other. Following the same example of Table 5.2.12.2.1-1 in TS 23.502; the type of information defined as SUPI (which is the UE unique identifier) can be used as the data set key for the data set identifier "Subscription Data"; and the type of information "PDU Session ID" can be used as a data sub key to further specialize/filter the "UE context in SMF data" data sub set of "Subscription Data". An example of usage of the data set key and/or data sub key is when a consumer uses such information to filter in a query to CP NF enhanced with historical records a specific UE with a specific PDU session ID. Another example of the usage of the Data set key and/or data sub set key is related to UDM, where a request for a data type (i.e., data set) at UDM can be filtered using a data key and/or a data sub key as described in TS 23.502 Table 5.2.3.3.1-3. For instance, a request sent to UDM querying for information about the data set identifier (i.e., data type) "UE context in SMF data" can also contain the data set key and sub keys, respectively: SUPI and S-NSSAI.

Information type or field (of record): is the data field to be stored in the CP entity. Examples of data stored in the CP entity are: SM Policy data (defined in details in TS 29.519), AMF Subscription Data (defined in details in TS 29.505). In general information describes:

UE related data: e.g., UE #1 has subscription information #A, UE #1 has session information #B (e.g., PDU session a, b, c;) and mobility policies, location information (UE #1 is located in Cells x, y, z).
And/or network slice related data: e.g., mapping of S-NSSAIs to TA and the respective cells in a given point in time.

An Information type has a relationship with a Data Set identifier and/or a Data Subset identifier.

Information value: is the actual value associated to an information type.

Record: defines in a unique way one instance/occurrence of the tuple: Data Set Identifier, Data Sub Set Identifier, Information value, for a given Data Set Key and/or Data Sub Key.

BRIEF DESCRIPTION OF DRAWINGS

The above described aspects and implementation forms will be explained in the following description of specific embodiments in relation to the enclosed drawings, in which

FIG. 11 shows a method for a second network entity, according to an embodiment of the invention.

FIG. 12 shows a method for a third network entity, according to an embodiment of the invention.

DETAILED DESCRIPTION OF EMBODIMENTS

Embodiments of the invention provide network entities and methods, and in particular, provide data structures and services for enhancing CP network entities of a mobile network—with specific emphasis in 5G mobile network architecture—to determine past (historical) and/or current (actual) association information of other network entities and/or network properties that have been and/or are mapped to or serving an area of interest (e.g. network properties mapped to the area of interest and/or 5GS entities serving the area of interest). At the same time, embodiments of the invention minimize the load for collecting such information. The purpose is to allow e.g. an analytics function of a mobile operator to further collect specialized data from the identified network entities and/or network properties in the area of interest for analytics generation.

Figure 1:
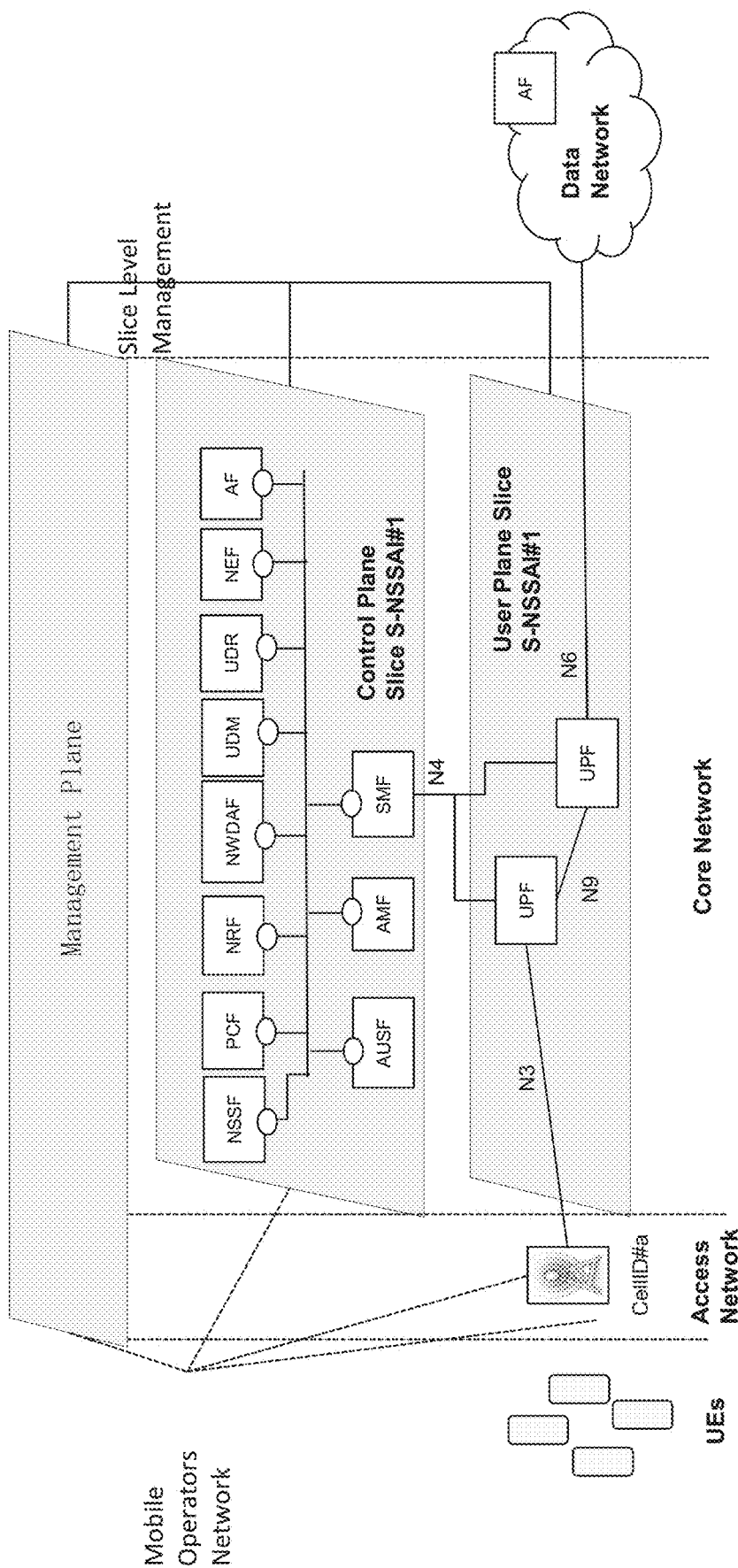
FIG. 1 shows an example of a mobile network following a 5G architecture as defined by 3GPP.
Figure 2:
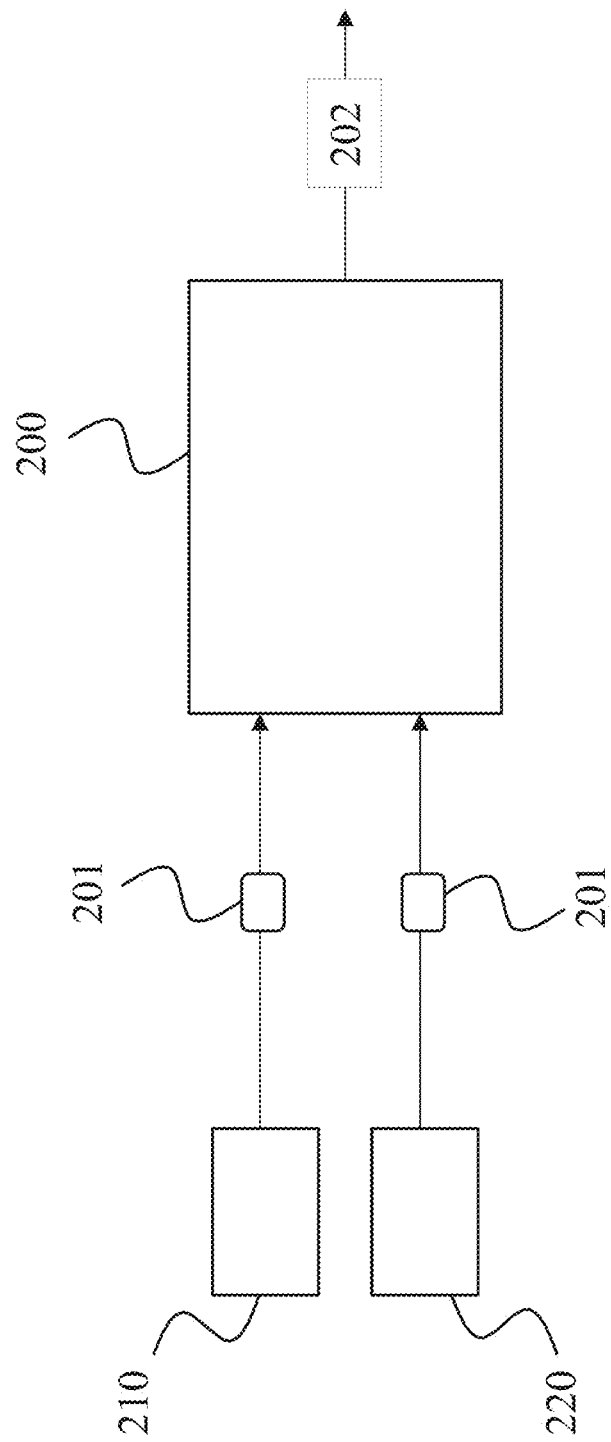
FIG. 2 shows a first network entity for analytics generation, a second network entity for supporting analytics generation, and a third network entity for supporting analytics generation, according to embodiments of the invention.

FIG. 2 shows a first network entity 200, a second network entity 210, and a third network entity 220, respectively, according to embodiments of the invention. The first network entity 200 may be a CP entity, in particular, it may be or comprise a NWDAF. The first network entity 200 may implement an analytics function. The second network entity 210 may be a CP entity, in particular may be or comprise a UDM and/or UDR and/or NWDAF. The third network entity 220 may be a CP entity, in particular, it may be or comprise a SMF and/or an AMF and/or a NSSF and/or NEF and/or AF and/or NRF.

The first network entity 200 is configured to obtain, from the second network entity 210 and/or from one or more third network entities 220, past and/or current association information 201 for an area of interest. The past and/or current association information 201 indicates one or more other network entities and/or network properties that, respectively, have been (past) and/or are (current) mapped to or serving the area of interest.

The first network entity 200 is further configured to provide analytics information 202, the analytics information 202 being based on the obtained association information 201 for the area of interest. That is, the first network entity 200 may generate the analytics information 202 based on the association information 201. The network entity 200 may also expose and/or send the analytic information 202 and/or the association information 201, respectively, to another network entity, e.g., to the second network entity 202 and/or the third network entity 220.

Figure 3:
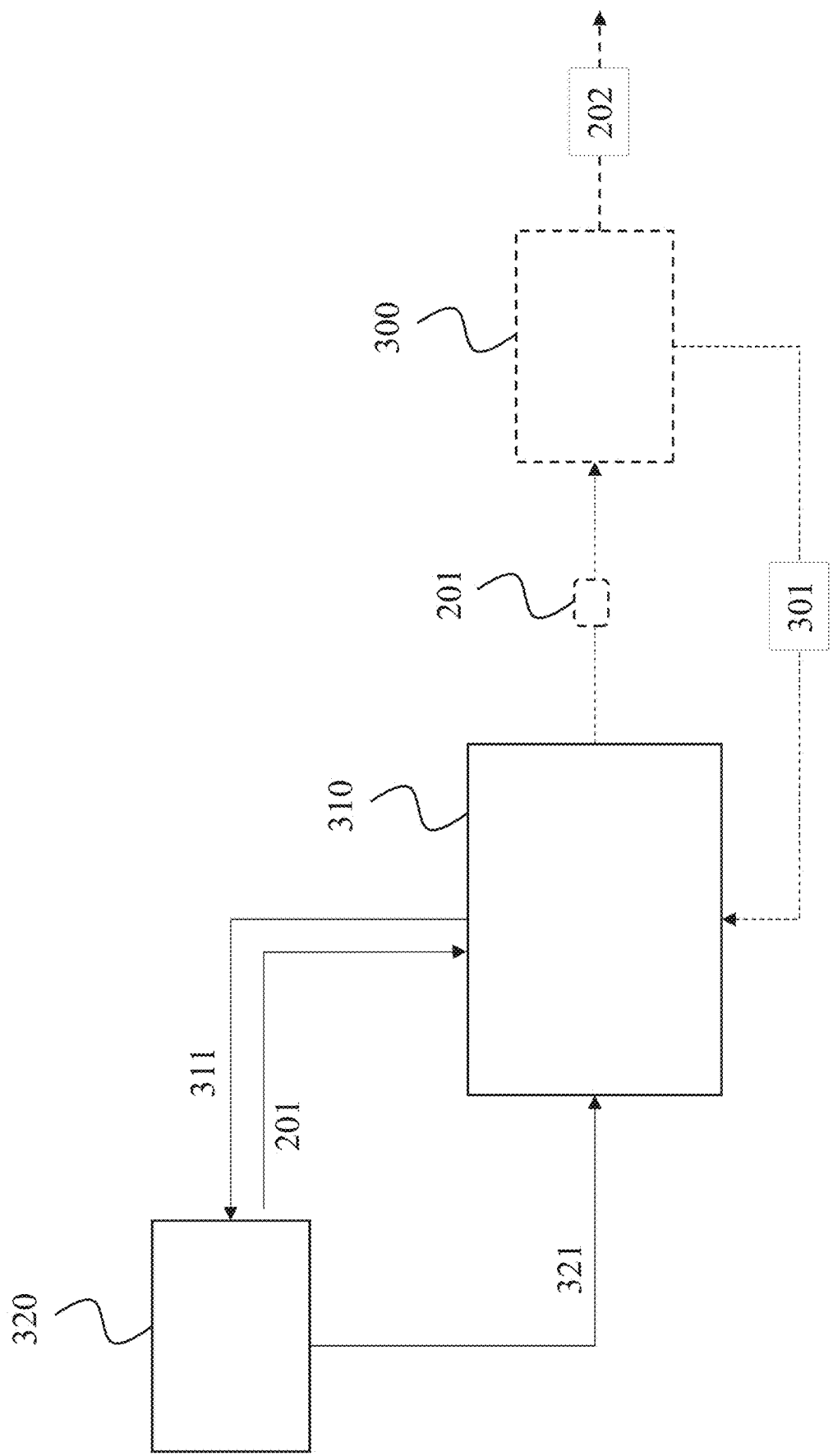
FIG. 3 shows a second network entity for supporting analytics generation, and a third network entity for supporting analytics generation, and a first network entity for analytics generation, according to an embodiments of the invention.

FIG. 3 shows a first network entity 300, a second network entity 310, and a third network entity 320, respectively, according to embodiments of the invention. The first network entity 300 may be the first network entity 200 shown in FIG. 2, the second network entity 310 may be the second network entity 210 shown in FIG. 2, and/or the third network entity 320 may be the third network entity 220 shown in FIG. 2.

FIG. 3 shows that the second network entity 310 is configured to obtain past and/or current association information 201 for an area of interest from one or more third network entities 320 (here only one third network entity 320 is shown), in response to a first request 311 sent to and/or according to a first subscription to the third network entity 320. That is, the third network entity 320 may receive the first request 311 from the second network entity 310, and may in response provide the association information 201 to the second network entity 310. Additionally or alternatively, the second network entity 310 is configured to obtain change information 321 from the one or more third network entities 320, upon lifecycle changes in one or more network entities and/or network properties related to the association information 201 (as provided by the third network entity 320). That is, the third network entity 320 may be configured to monitor a lifecycle, in the one or more network entities and/or network properties, and may provide the change information 321 to the second network entity 310, if detecting a lifecycle change. The change information 321 may indicated one or more changes with respect to a previously provided association information 201.

FIG. 3 shows further (indicated by the dotted lines), that the second network entity 310 may be configured to obtain a second request 301 and/or a second subscription for association information 201 of an area of interest, from the first network entity 300. Accordingly, the first network entity 300 may be configured to send the second request 301 and/or the second subscription to the second network entity 310. The second network entity 310 may then be configured to provide the obtained association information 201 (e.g., obtained from the third network entity 320) and/or aggregated association information 201 (e.g., aggregated association information 201 obtained from more than one third network entity 320) for an area of interest to the first network entity 300, i.e., in response to the second request 301 and/or according to the second subscription.

Figure 4:
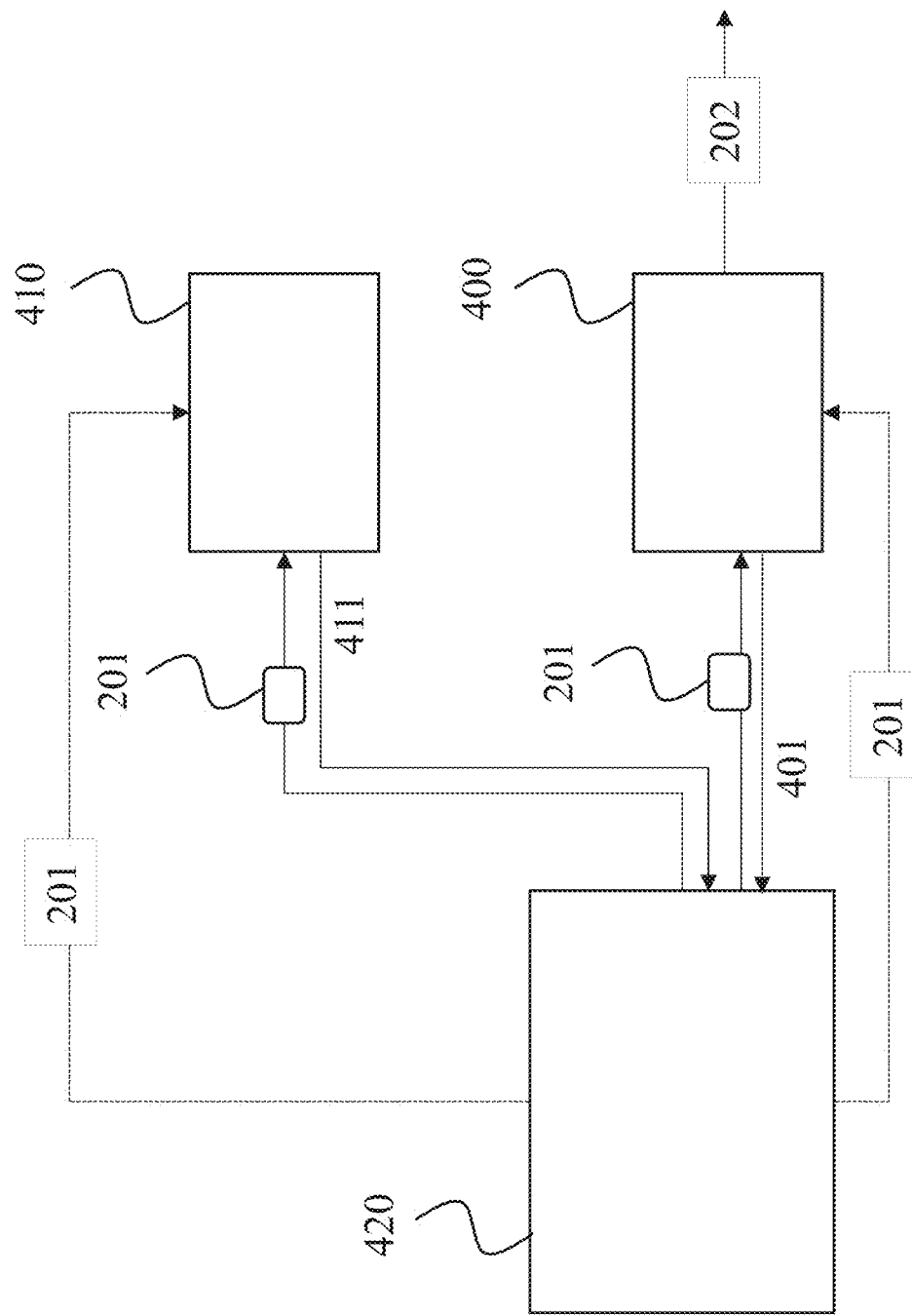
FIG. 4 shows a second network entity for supporting analytics generation, and a third network entity for supporting analytics generation, and a first network entity for analytics generation, according to an embodiments of the invention.

FIG. 4 shows a first network entity 400, a second network entity 410, and a third network entity 420, respectively, according to embodiments of the invention. The first network entity 400 may be the first network entity 200 and/or 300 shown in FIG. 2 and FIG. 3, the second network entity 410 may be the second network entity 210 and/or 310 shown in FIG. 2 and FIG. 3, and the third network entity 420 may be the third network entity 220 and/or 320 shown in FIG. 2 and FIG. 3.

The third network entity 420 is configured to provide past and/or current association information 201 for an area of interest to the first network entity 400, in response to a request 401 received from and/or according to a subscription from the first network entity 400. Further (in addition or alternatively), the third network entity 420 is configured to provide past and/or current association information 201 to the second network entity 410, in response to a request 411 received from and/or according to a subscription from the second network entity 410. Alternatively or additionally, the third network entity 420 is configured to provide association information 201 to the first network entity 400 and/or to the second network entity 410, upon changes in one or more target elements related to the association information 201, the one or more target elements being a network entity or a network property.

Each network entity shown in FIG. 2-FIG. 4 may, respectively, comprise processing circuitry (not shown) configured to perform, conduct or initiate the various operations of the network entity described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the network entity to perform, conduct or initiate the operations or methods described herein.

Figure 5:
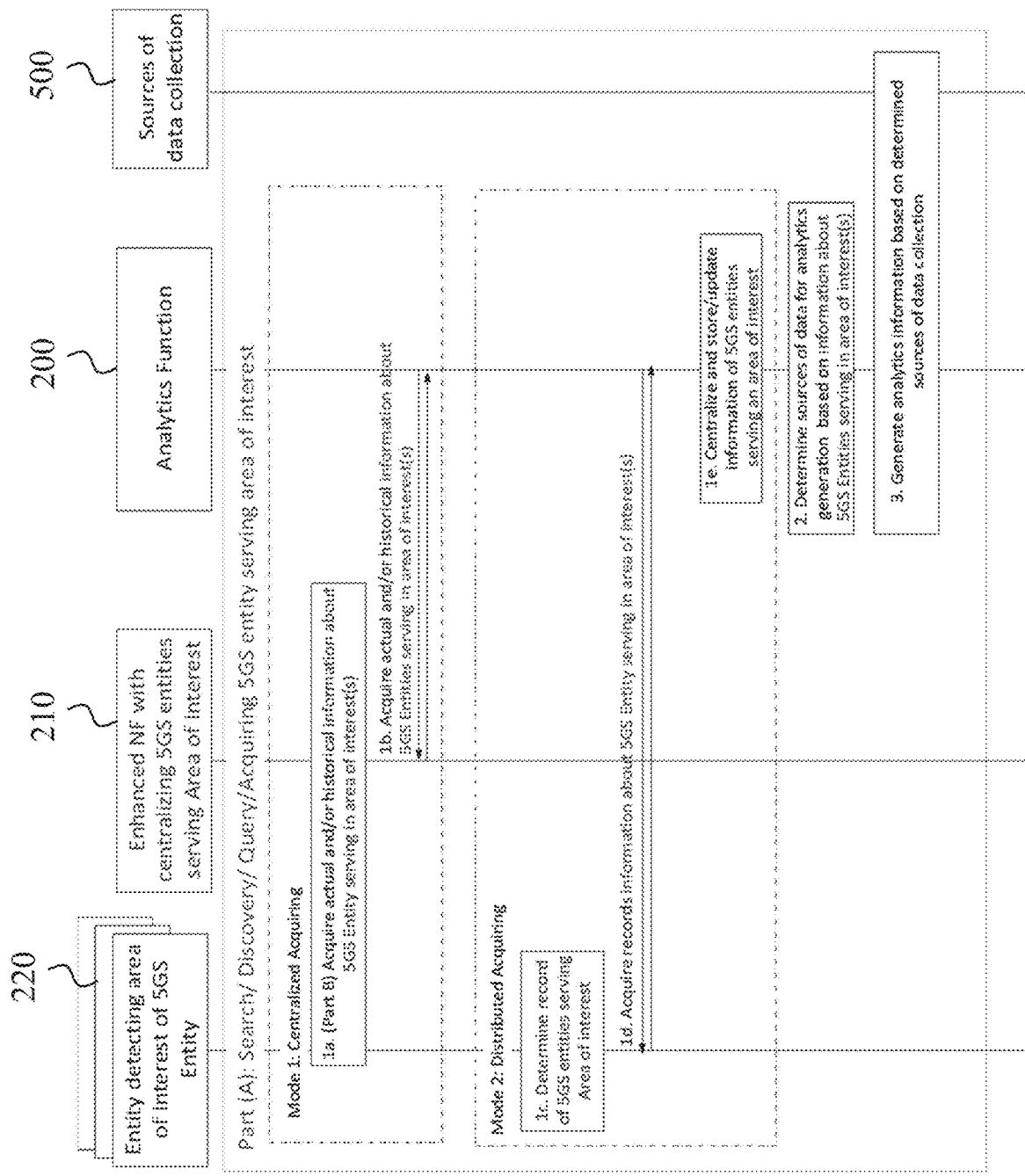
FIG. 5 shows a diagram of a method for enabling retrieval of past/and or current association information about 5GS entities serving in an area of interest, for analytics generation.

FIG. 5 shows a diagram of a method for enabling retrieval of past /and or current association information 201, in particular about 5GS entities serving in an area of interest, for analytics generation. Network entities 200, 210, and 220 participating to solve this problem are illustrated in FIG. 5. Notably, in the following description of embodiments, the reference signs 200, 210 and 200 (as used in FIG. 2) are used to label the first, second and third network entities, however, these network entities could likewise be the network entities 300, 310, and 320 (shown in FIG. 3) or 400, 410, and 420 (shown in FIG. 4). In FIG. 5, the "Analytics Function" is or comprises the first network entity 200, the "Enhanced NF with centralizing 5GS entities serving Area of Interest" is or comprises the second network entity 210, and the "Entity detecting area of Interest of 5GS Entity" is or comprises the third network entity 220.

A condition, in which the first network entity 200 may require association information 201 about 5GS entities serving in an area of interest, can be related to any of the following situations:
Receiving a request to generate analytics information 202 for a given area of interest without any specific UE and/or NF instance indicated in the request.
Being configured (e.g., a requested subscription to analytics information) to periodically generate analytics information 202, and therefore periodically have to update the 5GS entities serving in area(s) of interest.
Being configured (e.g., by script, configuration file) to periodically collect the association information 201 about 5GS Entities serving in area(s) of interest to support analytics information 202 generation.

In this disclosure, two modes are provided for the first network entity 200 to acquire the association information 201, particularly, about 5GS entities serving in one or more areas of interest.

Operation Mode 1 (centralized acquiring): The first network entity 200 interacts with the second network entity 210, and obtains from the second network entity 210 the association information 201. In this operation mode 1, the second network entity 210 is capable to detect one or more other network entities (here 5GS entities) serving in the area of interest, and to provide and/or maintain association information 201 for any type of such 5GS entity. The second network entity 210 may implicitly acquire the association information 201 on the 5GS entities serving the area of interest from one or more third network entities 220 detecting the area of interest 5GS entities. The one or more third network entities 220 may implicitly provide the 5GS entity data, e.g. due to lifecycle changes in such 5GS entities. The description of how the second network entity 210 further obtains the association information 201 of different types of 5GS entities serving the area(s) of interest, is detailed with respect to FIG. 6 below.

Operation Mode 2: (distributed acquiring): The first network entity 200 interacts with one or more third network entities 220, and obtains from such third network entity(s) 220 the association information 201. In this operation mode 2, there may exist different third network entities 220, providing different types of association information 201 for different types of other network entities or network properties. For instance, one third network entity 220 may be able to provide only the UE type of 5GS entity serving the area(s) of interest; while another third network entity 220 may be able to provide only the TA, cell, network slice identification types of 5GS entities serving the area(s) of interest. In this operation mode 2, the first network entity 200 is also responsible for centralizing the storage/update of the association information 201 (e.g., records) of e.g. 5GS entities serving in area of interest. As the first network entity 200 obtains such information from one or more third network entities 220, the first network entity 200 may aggregate such parts of information into a single data structure, where it has the overall mapping of all 5GS entities per area of interest.

FIG. 5 illustrates steps of a "Part A" of the method provided according to an embodiment of the invention (operation mode 1 and 2, respectively). In this method the steps 2-3 depicted in FIG. 5 are common to both the operation modes 1 and 2.

The steps in the operation mode 1 may be as follows:
1a. The second network entity 210 interacts with one or more third network entities 220 to obtain the information about 5GS entities serving in one or more area(s) of interest, according to the supported types of 5GS entities that the third network entities 220 can provide. The details of possible alternatives of such interaction are described with respect to FIG. 6 below.

1b. The first network entity 200 desires information about 5GS entities serving in the area(s) of interest, and interacts with the second network entity 210. Examples of ways, in which such interaction might happen, are via request 301 and response, and/or subscription-notification patterns of communication.

One example of an interaction model based on request-response is:

The first network entity 200 invokes a service from the second network entity 210 serving in the area(s) of interest.

The first network entity 200 invokes such a service including the area(s) of interest (e.g., in terms of cells, TA(s)) it requires and the type of 5GS entities (e.g. UEs, Applications, NFs, etc.) that should be determined as 5GS entities serving the requested area(s) of interest. If this is the first time that the first network entity 200 interacts with the second network entity 210 serving in the area(s) of interest, the first network entity 200 may not include in the interaction the area(s) of interest transaction identifier(s).

Based on the parameters used by the first network entity 200 in the service invoked, the second network entity 210 determines the list of 5GS entities serving in the area(s) of interest matching the received input parameters (e.g., the requested area(s) of interest and the types of 5GS entities and/or an area(s) of interest transaction identifier).

Then, the second network entity 210 checks, if an area of interest transaction ID was provided by the first network entity 200.

If not (e.g., in the case of the first interaction among these entities), the second network entity 210 also generates an area of interest transaction identifier and includes such transaction identifier in the information as well as all the determined 5GS entities serving in area(s) of interest in the response back to the first network entity 200. The second network entity 210 keeps the mapping among the determined 5GS Entities serving in area of interest, the first network entity 200 (analytics function) identifier and the generated area of interest transaction identifier for such analytics function identifier.

If the first network entity 200 provided also an area of interest transaction identifier in the input parameters, the second network entity 210 determines the set of records of 5GS entities serving in the area(s) of interest in the intersection between the current determined 5GS entities serving in area(s) of interest and the 5GS entities serving in area(s) of interest mapped to the transaction identifier (both terminology are synonyms, area of interest transaction identifier or transaction identifier).

When there is not an empty set of records of 5GS entities serving in the area(s) of interest in the intersection between the current determined 5GS entities serving in area(s) of interest and the previous 5GS entities serving in the area(s) of interest mapped to the provided transaction identifier, the second network entity 210 will include in the return to the first network entity 200 the set of records of 5GS entities serving in the area(s) of interest of intersection, generates a new transaction identifier, updates the mapping among the current determined 5GS entities serving in area(s) of interest, the analytics function identifier and the generated area(s) of interest transaction identifier for such analytics function identifier. The second network entity 210 may also keep the history of the previous mappings.

Notably, possible alternatives of how the second network entity 210 determines the current 5GS entities serving in area(s) of interest is described in detail in FIG. 6 and in the embodiments described below.

The steps in the operation mode 2 may be as follows:

1c. The one or more third network entities 220 are able to control the lifecycle of 5GS entities and/or network properties. For instance: UE registration to the network, UE session establishment; NFs configured in an area of interest. The one or more third network entities 220 map the controlled 5GS entities to the area(s) of interest. Upon 5GS entity lifecycle changes (e.g., a UE changes its location, thus it is possible that the UE serving in the area of interest changed), the one or more third network entities 220 update the mapping and keep the records of the previous mapping and the new current mapping.

1d. The first network entity 200 desires information about 5GS entities serving in one or more areas of interest and interacts with the one or more third network entities 220 serving in the area(s) of interest. Examples of ways, in which such interaction might happen, are via request-response and/or subscription-notification patterns of communication.

The first network entity 200 invokes services from the different third network entities 220 serving in the area(s) of interest, including at least the area(s) of interest (e.g., in terms of Cells, TA(s)) it requires. It can also include the types of 5GS entities and/or properties that are relevant to be retrieved and/or the transaction identifier.

The description of the step 1b issues on the interactions and how the transaction identifier regulates the output of the one or more third network entities 220 serving in area(s) of interest to the first network entity 200 apply. The difference from operation mode 2 to operation mode 1, is that in operation mode 2, the first network entity 200 may further perform aggregation of the obtained information about 5GS entities serving in area(s) of interest to create the mapping of all types of 5GS entities serving in an area of interest.

1e. The first network entity 200 upon receiving the 5GS entities serving in the area(s) of interest from one or more third network entities 220 serving in the area(s) of interest, aggregates such different obtained information into a data structure able to map for an area of interest, each 5GS entity type, and the dataset key and/or sub keys per 5GS entity type. Including also in the mapping the transaction identifier and/or an interval of time of the obtained information that comprises the current mapping of 5GS entities serving in the area(s) of interest.

The same principle described in step 1b, on how to identify the current and previous mapping among 5GS entities serving in the area(s) of interest is also applicable to how first network entity 200 keeps this mapping.

Independent of the different interaction ways that the first network entity 200 might use to acquire the information about 5GS entities serving in the area of interest (s), such services from the second network entity 210 and/or one or more third network entities 220 serving in the area(s) of interest can include further search criteria such as, temporal or quantitative aspects related to information about 5GS entities serving in the area(s) of interest.

2. The first network entity 200 retrieves data related to the area(s) of interest, and may determine which 5GS entities are the sources of data collection for the required area(s) of interest. Based on the obtained information about 5GS entities serving in area(s) of interest (from the second network entity 210 and/or one or more third network entities 220, the first network entity 200 determines such sources of data collection 500.

For instance, if the first network entity 200 has to identify the NFs instances and/or NF sets (e.g., NF type of 5GS entity) serving an area of interest (e.g., a list of TA(s)), the first network entity 200 obtains in Step 1 the information about NF instances serving the area of interest (e.g., {TA1, TA2, TA3}), and such information is for instance a list of all NFs instances per TA: ({TA1:NF #a, NF #b}, {TA2:NF #c}, TA3:NF #d, NF #e}). In this example, the first network entity 200 determines that the sources of data collection for the TA1, TA2, TA3 (i.e., the area of interest) are the NF instances: NF #a, NF #b, NF #c, NF #d, NFe.

3. The first network entity 200, based on the determined sources of data collection 500, selects and/or retrieves the data from the determined source of data collection 500 and generates analytics information 202.

Figure 6:
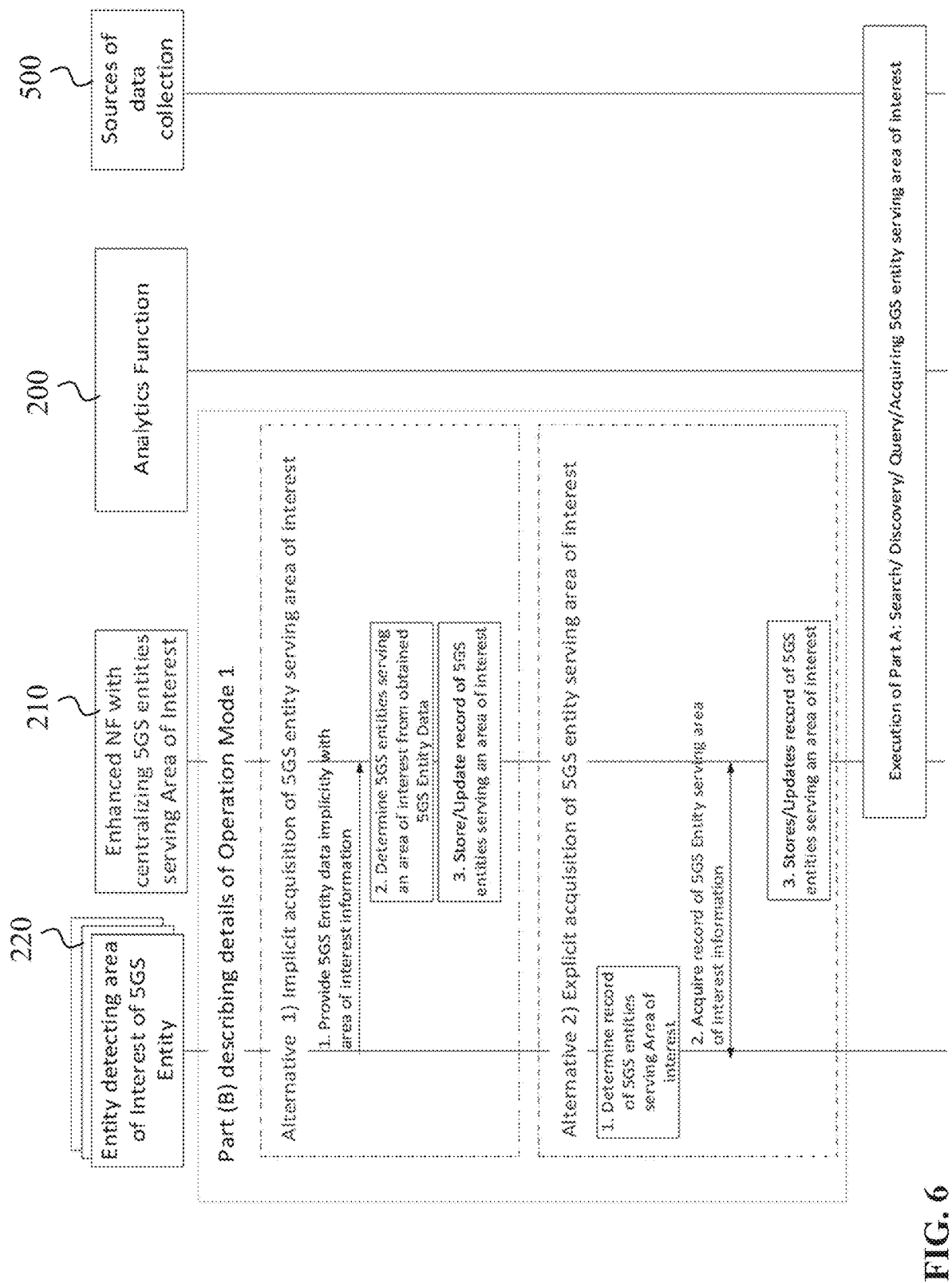
FIG. 6 shows a diagram of a method for enabling retrieval of past/and or current association information about 5GS entities serving in an area of interest, for analytics generation.

FIG. 6 illustrates steps of a "Part B" of the method provided according to an embodiment of the invention (operation mode 1). In particular, two alternatives on how the centralization of information on 5GS entities serving one or more areas of interest can be achieved by the second network entity 210 serving the area(s) of interest. The alternatives and the steps of the methods for each alternative are described as follows:

Alternative 1: One or more second network entities 210 serving the area(s) of interest implicitly obtain the information about 5GS entities serving in the area(s) of interest from one or more third network entities 220 serving in the area(s) of interest.

1. The one or more third network entities 220 serving in area(s) of interest are able to control the lifecycle of 5GS entities and/or properties. For instance: UE registration to the network, UE session establishment; NFs configured in an area of interest. Upon 5GS entity lifecycle changes (UE location change, session modification, new NF instance include in network slice), the third network entities 220 serving in one or more areas of interest sends to the one or more second network entities 210 serving in the area(s) of interest, the 5GS entity data related to the change in the lifecycle (e.g., updated UE SMF Context, or UE AMF context) without explicitly indicating the information about 5GS entity serving an area of interest.

2. Based on the obtained 5GS entity data, the one or more second network entities 210 serving the area(s) of interest identify from the 5GS entity data the area of context data set key, the one or more 5G entity types related to the 5GS entity data, and for each 5G entity type the related 5G entity data key and/or data sub key.

3. The one or more second network entities 210 serving the area(s) of interest update the mapping of current 5GS entities serving in the area(s) of interest, and store the previous records of 5GS entities serving in area(s) of interest for enabling search on historical information.

Alternative 2: the one or more second network entities 210 serving the area(s) of interest explicitly obtain records with the information about 5GS entities serving in the area(s) of interest from one or more third network entities 210 serving in the area(s) of interest.

1. The one or more third network entities 210 serving in the area(s) of interest has the mapping between its controlled 5GS entities lifecycle changes and the information of such 5GS entities serving the area(s) of interest. Upon 5GS entity lifecycle changes (UE location change, session modification, new NF instance include in network slice), the one or more third network entities 220 serving in area(s) of interest updates its own mapping of 5GS entities serving area of interest.

2. The one or more second network entities 210 serving the area(s) of interest interact with the one or more third network entities 220 serving in the area(s) of interest, in order to obtain the information about the 5GS entity serving the area(s) of interest for the type of 5GS entity controlled by such entity detecting 5GS entities serving in the area(s) of interest. Examples of ways, in which such interaction might happen, are via request-response and/or subscription-notification patterns of communication.

The one or more second network entities 210 serving the area(s) of interest invoke services from the different third network entities 220 serving in the area(s) of interest, including at least the area(s) of interest (e.g., in terms of Cells, TA(s)) it requires. It can also include the types of 5GS entities and/or properties that are relevant to be retrieved and/or the transaction identifier.

The one or more third network entities 220 serving in the area(s) of interest provide one or more records of 5GS entities serving area of interest.

3. The one or more second network entities 210 serving the area(s) of interest update the mapping of current 5GS entities serving in the area(s) of interest, and store the previous records of 5GS entities serving in the area(s) of interest for enabling search on historical information.

The following details are common to all operation modes:

One issue that needs to be considered by the first network entity 200 is it actually executes the generation (and/or update) of analytics information 202 based on 5GS entities serving an area of interest. There are different possibilities to execute such generation (and/or update) of analytics information 202 based on 5GS entities serving an area of interest which apply to all the operation modes of embodiments of this invention. For instance one or more of the following alternatives could be used by the first network entity 200:

The first network entity 200 can be configured to trigger and/or execute updates on the generation of analytics information 202 whenever a new and/or a change in the obtained 5GS entities serving an area of interest.

The first network entity 200 can be configured to trigger and/or execute updates in the analytics generation periodically. Therefore, all changes to the 5GS entities serving an area of interest obtained by the first network entity 200 will be queued to be used only when the cycle of new generation (and/or update) of analytics is due.

The first network entity 200 can be configured with a queue that stores the changes in the 5GS entities serving an area of interest over a period of time, either when the queue is full and/or the period of time is approaching the first network entity 200 trigger and/or execute the generation and/or update of the analytics information.

The first network entity 200 can be configured with different levels of urgency for triggering generation and/or update of analytics information 202 based on obtained information about 5GS entities serving an area of interest. For instance, changes in specific types of 5GS entities serving an area of interest or for specific area of interests, should immediately trigger and/or execute the generation and/or update of analytics information 202 based on the changed 5GS entities serving an area of interest, while other types of 5GS entities serving an area of interest and/or specific areas of interest can work using the queue schema described before.

The first network entity 200 can trigger and/or perform the generation of analytics information 202 based on the 5GS entities serving an area of interest when the first network entity 200 receives a request and/or subscription to an analytics information (e.g., Analytics ID as defined in TS 23.288) that requires the first network entity 200 to identify which are the 5GS entities serving an area of interest to determine the entities to collect and/or use the data for analytics calculation (i.e., generation).

Exemplary advantages of embodiments of the invention include:

Reduction of signaling related to the first network entity 200 (e.g., NWDAF) data collection for determining 5GS entities serving area(s) of interest, because the first network entity 200 can obtain such information from the centralized entity.

Reuse of existing messages already exchanged among 5G NFs to derive the information on 5GS entities serving an area of interest, therefore reducing the load of data collection for analytics generation.

Control over amount of data exchanged between the first network entity 200 and other NFs (e.g., UDM, UDR) that guarantees that only the portion of information on 5GS entities serving an area of interest that is not available at the first network entity 200 is transmitted.

In the following, exemplary specific embodiments of this invention based on a 5G mobile network following the architecture defined in 3GPP TS 23.501 are described. There are different alternatives of such exemplary embodiments, even within the 5GS.

A first embodiment based on operation mode 1 with alternative 1 is now described. In particular, this first embodiment is based on UDM providing current and/or historical 5GS entities and/or properties (association information 210) serving in one or more areas of interest. In this first embodiment, the network entities according to embodiments of the invention are mapped as follows:

The NWDAF is the first network entity 200 (e.g. analytics function)

The AMF is a third network entity 220, and is capable to detect: UEs, cells, TAI, network slices, and/or AMF NF type serving in the area(s) of interest The SMF is a third network entity 220, and is capable to detect: sessions, applications, Data Network Names (DNNs), Data Network Access Identifiers (DNAIs), network slices, and/or SMF NF type serving in the area(s) of interest The UDM is the second network entity 210 serving in an area of interest, and is enhanced with:

A data set "Area of Interest Context", wherein the association information 201 of 5GS entities serving in the area of interest are stored and maintained. Fields and information in this data set may be defined as in Table 1.

TABLE 1

Entities serving area of interest, 5G entity types, and keys

| Data Set | 5G Entity Type Fields | Data Key | Data Sub Key |
|---|---|---|---|
| Area of Interest (AoI) Context | Area of Interest | Cell and/or TAI | Transaction ID |
| | For each Area of Interest data key | | |
| | UE | SUPI or Internal Group Identifier(s), External Group Identifier | UE address(es) |
| | NF | NF Type | NF Set and/or NF ID |
| | Network Slice | S-NSSAIs and/or NSI | |
| | Data Network Session | DNN and/or DNAI SSC mode and/or PDU Session Type | |
| | Application | Application ID | |

A service "Nudm_AoICM" to enable consumers (e.g., NWDAF) to invoke such services to retrieve the information of 5GS entities serving in the area of interest maintained by UDM. In this embodiment, this information is maintained by the "Area of Interest Context" data set at UDM. Table 2 details service operations, input and output parameters of each of the operations of the Nudm_AoICM service.

TABLE 2

UDM new service related to 5GS entities serving in area of interest

| UDM service | Service Operations | Description | Inputs, Required | Inputs, Optional | Outputs, Required | Outputs, Optional |
|---|---|---|---|---|---|---|
| Area of Interest Context Management (AoICM) | Get | Consumer NF gets the 5GS entities serving an area of interest indicated by the area of context data type input from UDM. | List of area of interest (e.g., indexed by Cell and/or TAI), search criteria (e.g., temporal interval or number of records), transaction ID If no area of interest is | 5G Entity type(s), Key and/or Data Sub Key(s). for each 5G entity type(s) If 5G Entity type is set of "any", this means the consumer is interested in all types of | The consumer NF gets for each area of interest the requested 5G Entities serving an area of interest, and updated transaction ID | None |

TABLE 2-continued

UDM new service related to 5GS entities serving in area of interest

| UDM service | Service Operations | Description | Inputs, Required | Inputs, Optional | Outputs, Required | Outputs, Optional |
|---|---|---|---|---|---|---|
| | | included, the consumer will receive all current records for each area of interest. If no search criteria nor transaction ID is included, only the current record for each area of interest will be provided. | | 5G Entities serving an area of interest. | | |

This embodiment focuses on the usage of the service operation Nudm_AoICM_Get to allow NWDAF 200 to retrieve the 5GS entities serving in the area of interest. The Nudm_AoICM_Get service operation allow consumers of such operation to get access to both current and historical 5GS entities serving in the area of interest.

In this embodiment, it is assumed that the UDM 210 is configured (e.g., by operator policies) with the list of types of 5GS entities, as well as the list of the area(s) of interest that are to be mapped by the UDM 120 and stored in the Area of Interest (AoI) dataset.

In this embodiment, one important aspect highlighted is how to use existing signalling defined in TS 23.502 among the 5GS entities (which are embodiments of entities related to this invention), in order for the UDM 210 to acquire the mapping of 5GS entities without having to use new types of signalling or extra information being transmitted in the existing signals. This embodiment represents the operation mode 1 with the alternative 1 of implicit acquisition of 5GS entities serving in area(s) of interest. This embodiment of the invention based on UDM-NWDAF interactions is described in FIG. 7.

Figure 7:
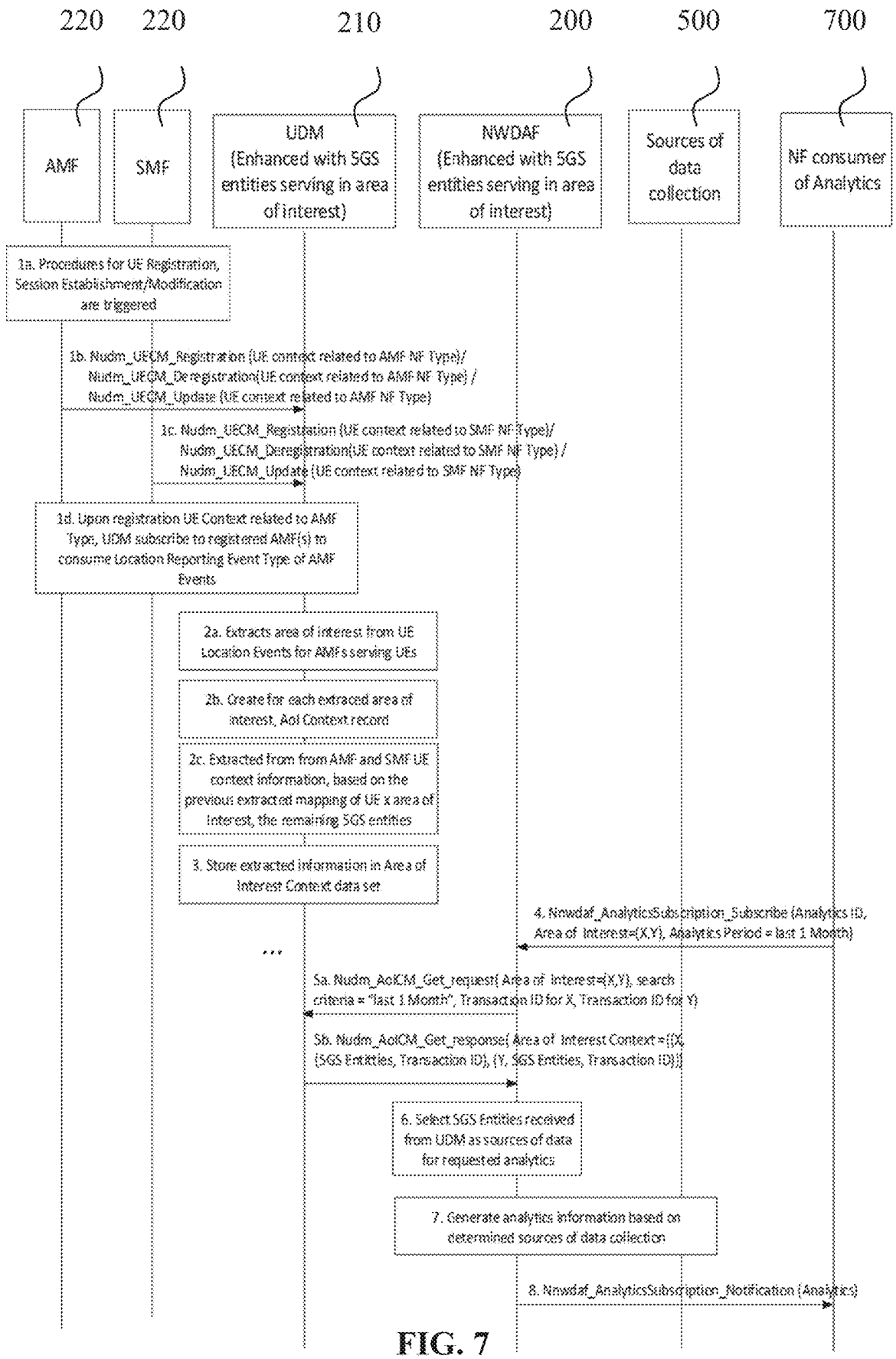
FIG. 7 shows a diagram of a method of a first alternative of a first operation mode, based on UDM and NWDAF interactions.

The steps 1-3 in FIG. 7 are an embodiment of the step 1a shown in FIG. 5. The embodiment of steps 1 and 2 of FIG. 6 are detailed in, respectively, steps 1 (1a-d) and 2 (2a-c) of FIG. 7. More specifically, the steps 2a-c in FIG. 7 show the aggregation of association information. These steps shows how this embodiment exploits the existing signalling at the AMF 220 and SMF 220 to provide 5GS entity data related to changes in the lifecycle of the 5GS entities (e.g., AMF related UE context, SMF related UE context, UE location) controlled by the SMF 220 and AMF 220. Based on the 5GS entity data acquired by UDM 210 from SMF 220 and AMF 220 that implicitly contains the support for determining the 5GS entities serving in area(s) of interest, the UDM 210 can aggregate the association information, e.g., extract the mapping of the 5GS entities to the area(s) of interest it has been configured to keep track of and create records for each area of interest in the AoI context dataset. The embodiment of step 3 of FIG. 6 is detailed in step 3 of FIG. 7.

As illustrated in FIG. 7, the steps 1-3 can happen multiple times and in parallel.

The embodiment of step 1b of FIG. 5 is detailed in steps 5a and 5b of FIG. 7. Embodiments of steps 2 and 3 of FIG. 5 are respectively detailed in steps 6 and 7 of FIG. 7.

FIG. 7 illustrates in steps 4 and 8, respectively, one possibility of how the NWDAF 200 may be triggered to obtain the 5GS entities serving in are of interest(s), and how the obtained information from the UDM 210 is reflected in the output of NWDAF 202.

A second specific embodiment is based on operation mode 1 with alternative 2. In particular, this second specific embodiment is based on UDM and UDR for providing past 5GS entities and/or properties serving an area of interest. In this embodiment, the network entities according to embodiments of the invention are mapped as follows:

The NWDAF is the first network entity 200 (e.g. analytics function).

The AMF is a third network entity 220 and is capable to detect: UEs, cells, TAI, network slices, and/or AMF NF type serving in one or more areas of interest.

The SMF is a third network entity 220 and is capable to detect: sessions, applications, DNNs, DNAIs, network slices, and/or SMF NF type serving in the area(s) of interest.

The UDM is a second network entity 210 and is capable to create a 5GS entity serving in an area of interest that consolidates the information from SMF 220 and AMF 220 into a single record. Nevertheless the UDM 210 is not the entity storing such record to allow the storage of past association information 201 about 5GS entities serving in area(s) of interest.

The UDR is an embodiment of a second network entity 210 and it is enhanced with:

A data set Area of Interest Context, where the information of 5GS Entities serving in area of interest are stored and maintained and the fields and information in this data set are defined in Table 3.

TABLE 3

Entities serving area of interest, 5G entity types, and keys

| Data Set | 5G Entity Type Fields | Data Key | Data Sub Key |
|---|---|---|---|
| Area of Interest (AoI) Context | Area of Interest | Cell and/or TAI | Transaction ID |
| | For each Area of Interest data key | | |
| | UE | SUPI or Internal Group Identifier(s), External Group Identifier | UE address(es) |
| | NF | NF Type | NF Set and/or NF ID |
| | Network Slice | S-NSSAIs and/or NSI | |
| | Data Network | DNN and/or DNAI | |

TABLE 3-continued

Entities serving area of interest, 5G entity types, and keys

| Data Set | 5G Entity Type Fields | Data Key | Data Sub Key |
|---|---|---|---|
| | Session | SSC mode and/or PDU Session Type | |
| | Application | Application ID | |

TABLE 4

UDR services enhanced to support retrieval of 5GS entities serving in area of interest

| UDR service | Service Operations | Description | Enhanced Inputs Fields, Required | Enhanced Inputs Fields, Optional | Enhanced Outputs Fields, Required | Enhanced Outputs Fields, Optional |
|---|---|---|---|---|---|---|
| Nudr_DM | Query | Consumer NF to query the datasets stored at UDR including the newly added AoI Context dataset. | List of area of interest (e.g., indexed by Cell and/or TAI), search criteria (e.g., temporal interval or number of records), transaction ID If no area of interest is included, the consumer will receive all current records for each area of interest. If no search criteria nor transaction ID is included, only the current record for each area of interest will be provided. | 5G Entity type(s), Key and/or Data Sub Key(s). for each 5G entity type(s) If 5G Entity type is set of "any", this means the consumer is interested in all types of 5G Entities serving an area of interest. | The consumer NF gets for each area of interest the requested 5G Entities serving an area of interest, and updated transaction ID | None |

This embodiment focuses on providing an embodiment based on all existing services of 5GS architecture defined in TS 23.502. The enhancements are on functionalities of NFs, new data type structures, and extensions of existing service operations. In addition, this embodiment allows a separation of concerns between the roles of UDM 210 and UDR 21β, compatible with current 3GPP 5GS architecture, where UDM 210 does not play the role of an entity unifying data while UDR 210 plays the role to the entity for storage of data.

Figure 8:
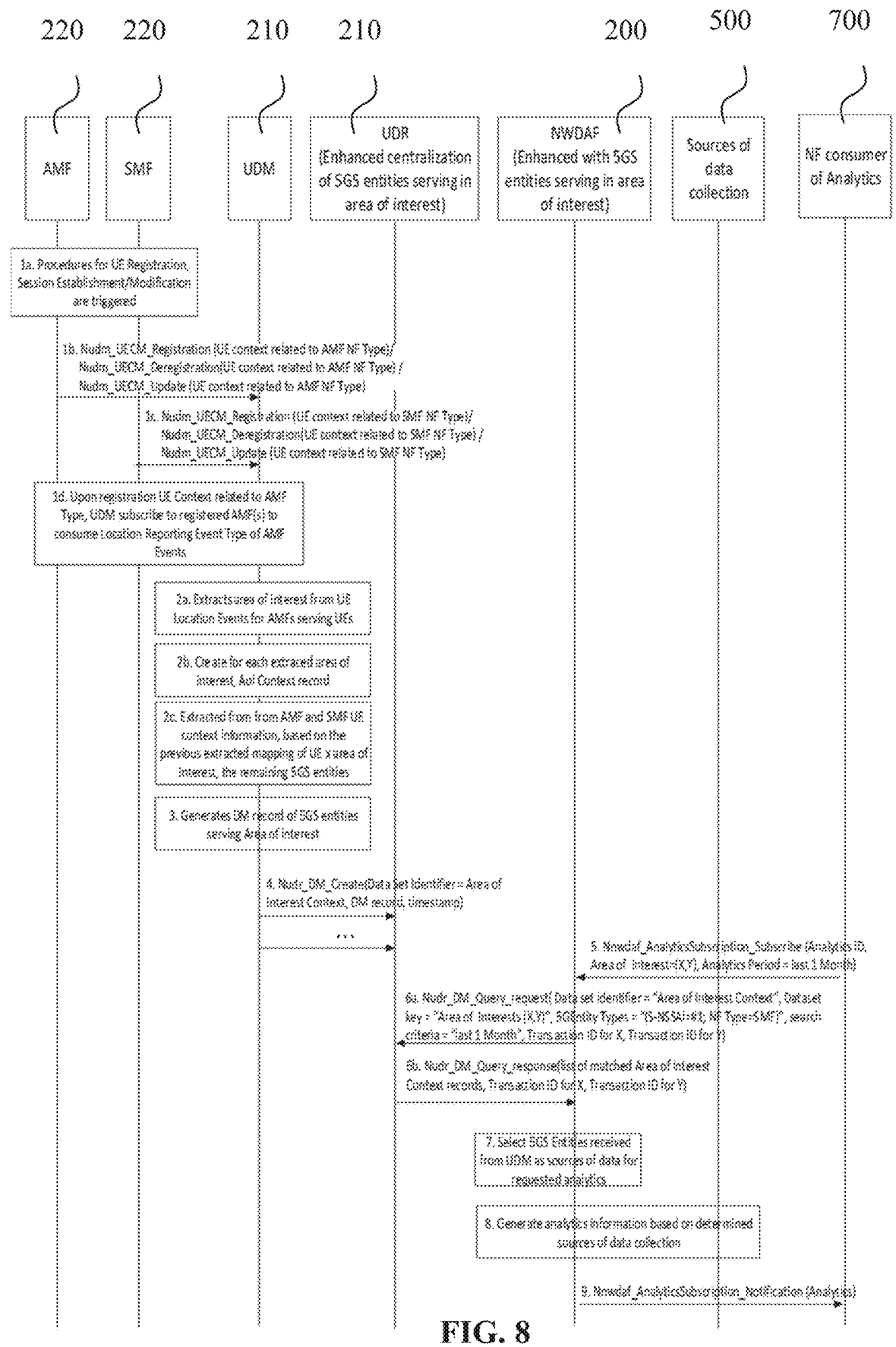
FIG. 8 shows a diagram of a method of a second alternative of a first operation mode, based on UDM, UDR, and NWDAF interactions.

The embodiment of the operation mode 1 with alternative 2 based on UDM, UDR and NWDAF interactions is described in FIG. 8. The steps 1-4 in FIG. 8 are an embodiment of the step 1a in FIG. 5. Steps 6a and 6b in FIG. 8 are an embodiment of step 1b in FIG. 5. FIG. 8 also illustrates, in the steps 5 and 9, respectively, one possibility of how the NWDAF 200 is triggered to obtain the 5GS entities serving in are of interest(s), and how the obtained information from URM 210 is reflected in the output of NWDAF 200.

Steps 1-3 in FIG. 8 are an embodiment of step 1 in FIG. 6. Step 4 in FIG. 8 is an embodiment of step 2 and 3 in FIG. 6. In addition, the step 2a-c in FIG. 8 show the aggregation of association information.

A third specific embodiment is based on operation mode 2 based on NRF and UDM providing current and/or past 5GS entities and/or properties serving an area of interest (following Event Exposure Framework Model). In this embodiment, the network entities according to embodiments of the invention are mapped as follows:

AMF is a third network entity 220 and is capable to detect: UEs, cells, TAI, network slices, and/or AMF NF type serving in one or more areas of interest.

The SMF is a third network entity 220 and is capable to detect: Sessions, Applications, DNNs, DNAIs, network slices, and/or SMF NF type serving in the area(s) of interest.

The NRF is a third network entity 220 and is capable to detect: all types of NFs serving in the area(s) of interest.

The UDM is a third network entity 220 and is capable create a 5GS entity serving in area of interest that consolidate the information from SMF 220 and AMF 220 into a single record. Nevertheless UDM 220 is not the entity storing such record to allow the storage of historical information about 5GS entities serving in area(s) of interest.

The NWDAF is a first network entity 200 (e.g., analytics function) and is a second network entity 210 serving in the area of interest, enhanced with Data set AoI context, where the information of 5GS entities serving in area(s) of interest are stored and maintained and the fields and information in this data set are defined in Table 5.

TABLE 5

Entities serving area of interest, 5G entity types, and keys

| Data Set | 5G Entity Type Fields | Data Key | Data Sub Key |
|---|---|---|---|
| Area of Interest (AoI) Context | Area of Interest | Cell and/or TAI | Transaction ID |
| | For each Area of Interest data key | | |
| | UE | SUPI or Internal Group Identifier(s), External Group Identifier | UE address(es) |
| | NF | NF Type | NF Set and/or NF ID |
| | Network Slice | S-NSSAIs and/or NSI | |
| | Data Network | DNN and/or DNAI | |
| | Session | SSC mode and/or PDU Session Type | |
| | Application | Application ID | |

There are different alternatives of how the services of the NFs enhanced with the capabilities of the entities defined in this embodiment of the invention can be implemented. Below we describe some of the possible service extensions.

Possible embodiments for how UDM 210 provides the detected 5GS entities serving in area of interest are as follows.

In this embodiment for the services of the UDM 210, the Event Exposure framework defined in TS 23.502 Clause 4.15 is followed. In this case a new monitoring event is defined to be detected by UDM 210 as detailed in Table 6.

TABLE 6

List of event for monitoring capability

| Event | Description | Which NF detects the event |
|---|---|---|
| Area of Interest Change (e.g., AoI Event) | Network detects changes in the 5GS Entities serving in a area of interest | UDM |

In addition, the UDM service for exposing the new type of event also has to be extended as defined in the Table 7.

TABLE 7

UDM enhancements on the event exposure service to provide detected 5GS entities serving in area of interest

| UDM service | Service Operations | Description | Enhanced Inputs Fields, Required | Enhanced Input Fields, Optional | Enhanced Outputs Fields, Required | Enhanced Output Fields, Optional |
|---|---|---|---|---|---|---|
| Nudm_EventExposure | Subscribe | The NF consumer subscribes for updates to the area of interest. | List of area of interest (e.g., indexed by Cell and/or TAI), Notification Target If no area of interest is indicated, this means that the consumer should be notified if any change in the Area of Interest Context dataset happens. | 5G Entity type(s), Key and/or Data Sub Key(s). for each 5G entity type(s) If 5G Entity type is set of "any", this means the consumer is interested in all types of 5G Entities serving an area of interest. | None | None |
| | Notification | The NF consumer is notified with updates to changes in subscribed area of interest | The consumer NF gets for each area of interest the requested 5G Entities serving an area of interest whenever a change happens in the mapping of 5GS entities serving in area of interest | Timestamp | None | None |

Possible embodiments for how NRF 210 provides the detected 5GS entities serving in the area of interest are as follows.

Figure 9:
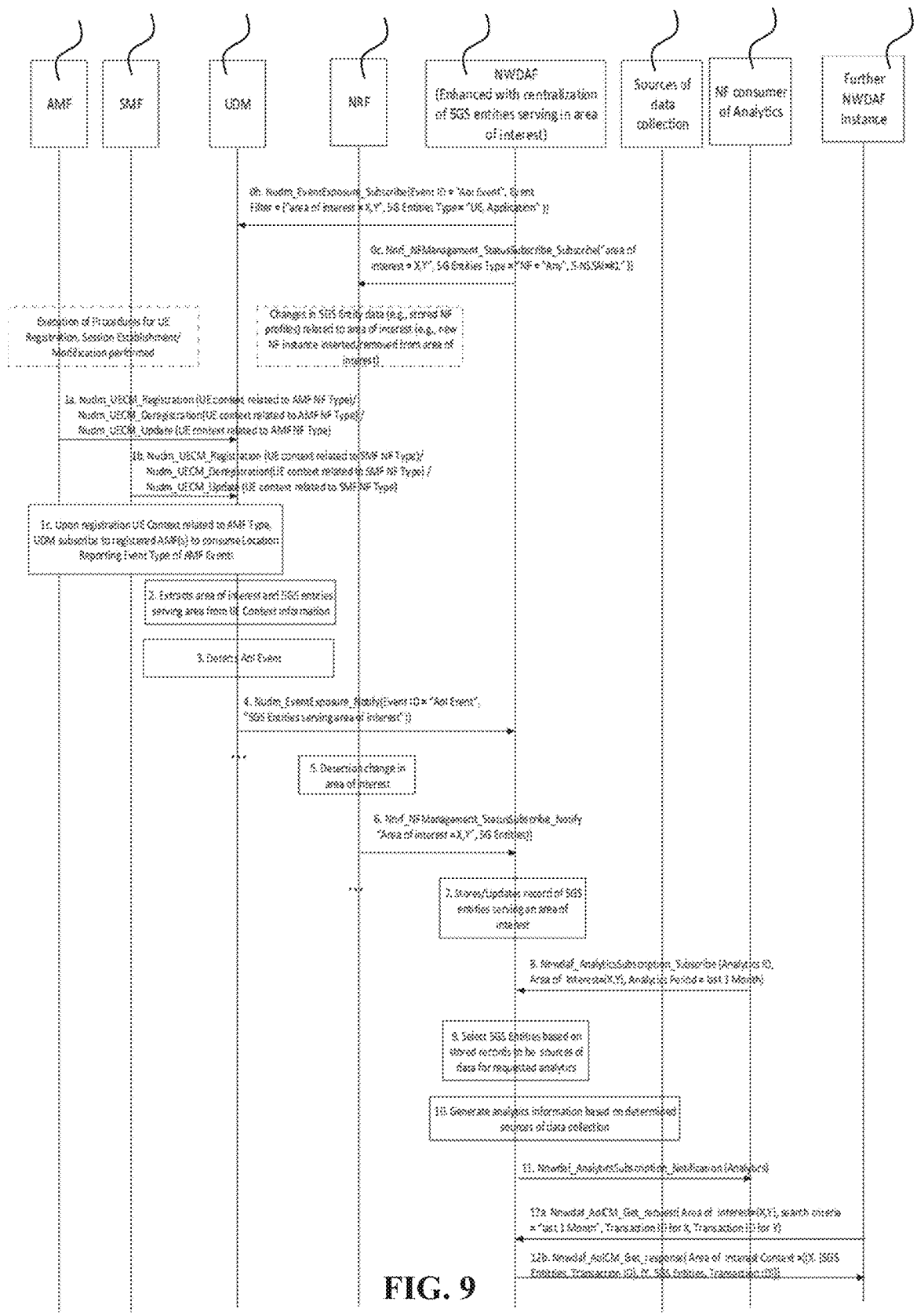
FIG. 9 shows a diagram of a method of a second operation mode, based on UDM, NRF, and NWDAF interactions, following event exposure framework principles.

2. The steps 4 and 6 of FIG. 9 show the embodiment of the step 1d of FIG. 5, now in the perspective of the UDM, NRF sending the answer for the requested (e.g., subscribed)

TABLE 7

NRF enhancements on service to provide detected 5GS Entities serving in Area of Interest

| NRF service | Service Operations | Description | Enhanced Inputs Fields, Required | Enhanced Input Fields, Optional | Enhanced Outputs Fields, Required | Enhanced Output Fields, Optional |
|---|---|---|---|---|---|---|
| Nnrf_NFManagement_StatusSubscribe | Subscribe | The NF consumer subscribes for updates to the area of interest. | List of area of interest (e.g., indexed by Cell and/or TAI), Notification Target If no area of interest is indicated, this means that the consumer should be notified if any change in the Area of Interest Context dataset happens. | 5G Entity type(s), Key and/or Data Sub Key(s). for each 5G entity type(s) If 5G Entity type is set of "any", this means the consumer is interested in all types of 5G Entities serving an area of interest. | None | None |
| | Notification | The consumer NF gets for each area of interest the requested 5G Entities serving an area of interest whenever a change happens in the mapping of 5GS entities serving in area of interest | Timestamp | None | None | The consumer NF gets for each area of interest the requested 5G Entities serving an area of interest whenever a change happens in the mapping of 5GS entities serving in area of interest |

This embodiment focuses on providing an embodiment based on the event exposure framework. In this case the NWDAF 200 is the entity responsible to centralize and store the mapping of all 5GS entities (types) serving in area(s) of interest. The NWDAF 200 obtains this information based on the subscription to events related to 5GS entities serving in area of interest from UDM 210 and NRF 210.

In addition, in this embodiment the NWDAF 200 can also provide the information about 5GS entities serving in area(s) of interest, which the NWDAF 200 centralized. For instance, FIG. 9 shows interaction among two different NWDAFs 200 (200a/200b). In this case, the NWDAF 200 serving in the area of interest is enhanced with the exact the same service Area of Interest Context Management (Ao-ICM) service as defined in Table 2. In this case the NWDAF services will be enhanced with the new service Nnwdaf_Ao-ICM service.

Further details of the embodiment of the operation mode 2, UDM, NRF and NWDAF interactions are shown in FIG. 9.

In this embodiment, step 0 of FIG. 9 is an embodiment of the step 1d of FIG. 5, showing the arrow when the first network entity 200, i.e., NWDAF 200 enhanced with centralization of 5GS entities serving in the area of interest (e.g., aggregation of association information), sends a request the third network entities 220 i.e., UDM and NRF. In this embodiment this request follows the subscribe-notify model of communication. Therefore, the NWDAF 200 subscribes to UDM 220 and NRF 220 events related to the 5GS entities serving in area of interest controlled by such NFs. The steps 1-3 and 5 of FIG. 9 show an embodiment of step 1c in FIG.

changes in 5GS Entities in area of interest. Step 7 of FIG. 9 is the embodiment of step 1e of FIG. 5. Steps 9 and 10 of FIG. 9 are the embodiment for Steps 2 and 3 of FIG. 5. It is also illustrated in FIG. 9, steps 8 and 11, respectively, one possibility of how NWDAF 200 is triggered to use the obtained the 5GS Entities serving in are of interest(s) in the analytics generation output of NWDA 200.

Finally, steps 12a and 12b of FIG. 9, illustrate how NWDAF 200 enhanced with centralization of 5GS entities serving in area of interest can provide 5GS entities serving in area of interest to further entities. In this case, the further entity can be another NWDAF instance.

Figure 10:
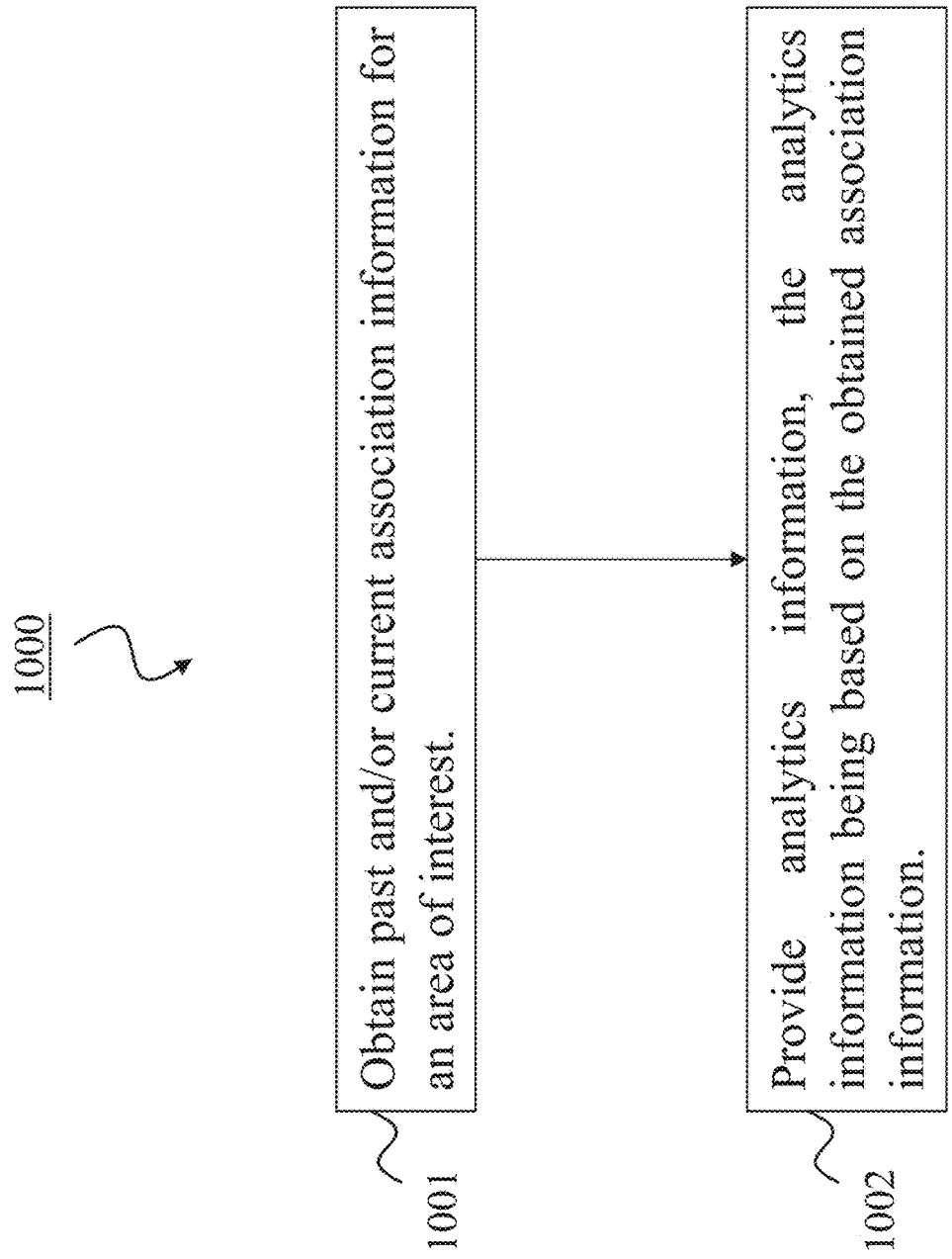
FIG. 10 shows a method for a first network entity, according to an embodiment of the invention.

FIG. 10 shows a method 1000 for a first network entity 200. The method 100 is for generating analytics. The method 1000 comprises a step 1001 of obtaining, from a second network entity 210 or from one or more third network entities 220, past and/or current association information 201 for an area of interest. Additionally or alternatively, the method 1000 comprises a step 1001 of providing 1002 analytics information 202, the analytics information 202 being based on the obtained association information 201.

FIG. 11 shows a method 1100 for a second network entity 210. The method 1100 is for supporting analytics generation. The method 1100 comprises a step 1201 of obtaining 1101 past and/or current association information 201 for an area of interest from one or more third network entities, in response to a first request 311 sent to and/or according to a first subscription to the one or more third network entities 220. Alternatively or additionally, the method 1100 comprises a step 1202 of obtaining change information 321 from one or more third network entities 220, upon lifecycle changes in one or more target elements related to the association information 201 provided by the one or more third network entities 220, the one or more target elements being a network entity or a network property.

FIG. 12 shows a method 1200 for a third network entity 220. The method 1200 is for supporting analytics generation. The method 1200 comprises a step 1201 of providing past and/or current association information 201 for an area of interest to a first network entity 200 and/or a second network entity 210, in response to a request 401, 411 received from and/or according to a subscription from the first network entity 200 and/or the second network entity 210. Alternatively or additionally the method 1200 comprises a step 1202 of providing 1202 association information 201 to a first network entity 200 and/or a second network entity 210, upon changes in one or more target elements related to the association information 201, the one or more target elements being a network entity or a network property.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A first network entity for analytics generation of a mobile network, the first network entity comprising:
   a processor; and
   a memory having processor-executable instructions stored thereon;
   wherein the processor is configured to execute the processor-executable instructions to facilitate performance of the following by the first network entity:
      subscribing for association information for an area of interest from a plurality of third network entities;
      obtaining, from the plurality of third network entities, past association information for the area of interest according to the subscription for association information for the area of interest, wherein the past association information indicates one or more other network properties that have been mapped to the area of interest;
      aggregating the obtained past association information for the area of interest, wherein aggregating the obtained past association information for the area of interest comprises creating a mapping of a plurality of types of 5G system (5GS) entities serving the area of interest based on 5GS entity data obtained from signalling at an Access and Mobility Management Function (AMF) and a Session Management Function (SMF); and
      providing analytics information based on the aggregated past association information;
   wherein the past association information for the area of interest comprises:
      one or more application identifications mapped to the area of interest;
      one or more session identifications mapped to the area of interest; and
      one or more data network identifications mapped to the area of interest; and
   wherein the first network entity is a control plane entity comprising a network data analytics function (NWDAF).

2. The first network entity according to claim 1, wherein the past association information is further for an area of interest transaction identification.

3. The first network entity according to claim 1, wherein the subscription for association information for the area of interest comprises at least one of:
   target area of interest, wherein the target area of interest is a spatial area related to the mobile network, from where the first network entity acquires the past association information for the target area of interest;
   target type of the one or more other network properties, wherein the target type describes a type of property that should be identified as mapped to the target area of interest;
   area of interest transaction identifier;
   identification of the first network entity; or
   temporal interval, wherein the temporal interval is a time window to be used for selecting of the one or more other network properties mapped to the target area of interest.

4. The first network entity according to claim 1, wherein the processor is further configured to execute the processor-executable instructions to facilitate performance of the following by the first network entity:
   determining, from the obtained past association information for the area of interest, the one or more other network properties mapped to the area of interest; and
   selecting and/or obtaining data from the one or more other network properties, wherein the analytics information is based on the selected and/or obtained data.

5. A second network entity for supporting analytics generation of a mobile network, the second network entity comprising:
   a processor; and
   a memory having processor-executable instructions stored thereon;
   wherein the processor is configured to execute the processor-executable instructions to facilitate performance of the following by the second network entity:
      obtaining past association information for an area of interest from a plurality of third network entities according to a first subscription to the plurality of third network entities, wherein the past association information indicates one or more other network properties that have been mapped to the area of interest;
      obtaining change information from the plurality of third network entities, upon lifecycle changes in one or more network properties related to the past association information provided by the plurality of third network entities: and
      aggregating the obtained past association information for the area of interest, wherein aggregating the obtained past association information for the area of interest comprises creating a mapping of a plurality of types of 5G system (5GS) entities serving the area of interest based on 5GS entity data obtained from signalling at an Access and Mobility Management Function (AMF) and a Session Management Function (SMF);

wherein the past association information for the area of interest comprises:
  one or more application identifications mapped to the area of interest;
  one or more session identifications mapped to the area of interest; and
  one or more data network identifications mapped to the area of interest; and
wherein the second network entity is a control plane entity comprising a unified data management (UDM) network function, a data repository, and/or a network data analytics function (NWDAF).

6. The second network entity according to claim 5, wherein the first subscription comprises the area of interest, and wherein the area of interest is a spatial area related to the mobile network, from where the second network entity acquires the past association information for the area of interest.

7. The second network entity according to claim 5, wherein the processor is further configured to execute the processor-executable instructions to facilitate performance of the following by the second network entity:
  obtaining a second subscription for association information of the area of interest from a first network entity; and
  providing the obtained past association information and/or the aggregated past association information for the area of interest to the first network entity according to the second subscription.

8. The second network entity according to claim 7, wherein the processor is further configured to execute the processor-executable instructions to facilitate performance of the following by the second network entity:
  obtaining or generating an area of interest transaction identification for the area of interest.

9. The second network entity according to claim 7, wherein the change information indicates a change in a lifecycle of the one or more network properties;
  wherein the processor is further configured to execute the processor-executable instructions to facilitate performance of the following by the second network entity:
    updating the past association information based on the change information; and
    providing the updated past association information and/or aggregated updated past association information to the first network entity.

10. The second network entity according to claim 7, wherein the second subscription for association information of the area of interest comprises at least one of:
  target area of interest;
  target type of the one or more other network properties, wherein the target type describes a type of property that should be identified as mapped to the target area of interest;
  area of interest transaction identifier;
  identification of the first network entity; or
  temporal interval, wherein the temporal interval is a time window to be used for selecting the one or more other network properties mapped to the target area of interest.

11. A third network entity for supporting analytics generation, the third network entity comprising:
  a processor; and
  a memory having processor-executable instructions stored thereon;
  wherein the processor is configured to execute the processor-executable instructions to facilitate performance of the following by the third network entity:
    providing past association information for an area of interest to a first network entity and/or to a second network entity according to a subscription from the first network entity and/or from the second network entity for use by the first network entity and/or for use by the second network entity in aggregating the past association information for the area of interest, wherein the past association information indicates one or more other network properties that have been mapped to the area of interest, and wherein aggregating the obtained past association information for the area of interest comprises creating a mapping of a plurality of types of 5G system (5GS) entities serving the area of interest based on 5GS entity data obtained from signalling at an Access and Mobility Management Function (AMF) and a Session Management Function (SMF); and
    providing updated past association information to the first network entity and/or to the second network entity, upon changes in one or more target elements related to the past association information, wherein the one or more target elements include a network property;
  wherein the past association information for the area of interest comprises:
    one or more application identifications mapped to the area of interest;
    one or more session identifications mapped to the area of interest; and
    one or more data network identifications mapped to the area of interest; and
  wherein the third network entity is a control plane entity comprising the SMF, the AMF, a network slice selection function (NSSF), a network exposure function (NEF), an application function (AF), and/or a network repository function (NRF).

12. The third network entity according to claim 11, wherein the subscription comprises at least one of:
  target area of interest, wherein the target area of interest is a spatial area related to a mobile network, from where the first network entity acquires the past association information for the target area of interest;
  target type of the one or more other network properties, wherein the target type describes the type of property that should be identified as mapped to the target area of interest;
  area of interest transaction identifier;
  identification of the first network entity; or
  temporal interval, wherein the temporal interval is a time window to be used for the selection of the one or more other network properties mapped to the target area of interest.

13. The third network entity according to claim 11, wherein the past association information for the area of interest further comprises at least one of:
  one or more user equipment (UE) identifications and/or UE group identifications mapped to the area of interest;
  one or more cell identifications mapped to the area of interest;
  one or more tracking area identifications mapped to the area of interest;
  one or more network slice identifications mapped to the area of interest;
  one or more network function (NF) identifications mapped to the area of interest;
  one or more NF set identifications mapped to the area of interest;

one or more external entity identifications mapped to the area of interest;

one or more Quality of Service (QOS) profile identifications mapped to the area of interest; or one or more public land mobile network (PLMN) identification mapped to the area of interest.

14. A method for analytics generation, the method comprising:

subscribing, by a first network entity, for association information for an area of interest from a plurality of third network entities;

obtaining, by the first network entity, from a second network entity or from the plurality of third network entities, past association information for the area of interest in response to a plurality of requests and/or according to the subscription for association information for the area of interest, wherein the past association information indicates one or more other network entities and/or network properties that, respectively, have been mapped to the area of interest;

aggregating the obtained past association information, wherein aggregating the obtained past association information for the area of interest comprises creating a mapping of a plurality of types of 5G system (5GS) entities serving the area of interest based on 5GS entity data obtained from signalling at an Access and Mobility Management Function (AMF) and a Session Management Function (SMF); and providing, by the first network entity, analytics information, wherein the analytics information is based on the aggregated past association information;

wherein the past association information for the area of interest comprises:

one or more application identifications mapped to the area of interest;

one or more session identifications mapped to the area of interest; and one or more data network identifications mapped to the area of interest; and wherein the first network entity is a control plane entity comprising a network data analytics function (NWDAF).

15. The method according to claim 14, wherein the past association information is further for an area of interest transaction identification.

16. The third network entity according to claim 11, wherein the processor is further configured to execute the processor-executable instructions to facilitate performance of the following by the third network entity:

sending change information to the first network entity and/or the second network entity based on lifecycle changes in one or more network properties related to the past association information.

17. The first network entity according to claim 1, wherein the past association information for the area of interest further comprises one or more network function (NF) identifications mapped to the area of interest.

18. The second network entity according to claim 5, wherein the past association information for the area of interest further comprises one or more network function (NF) identifications mapped to the area of interest.

19. The method according to claim 14, wherein the past association information for the area of interest further comprises one or more network function (NF) identifications mapped to the area of interest.

20. The first network entity according to claim 1, wherein aggregating the obtained past association information for the area of interest further comprises:

extracting the area of interest (AoI) from user equipment (UE) location events for AMFs serving UEs;

creating for the extracted AoI an AoI context record; and extracting, from AMF and SMF UE context information, based on a previous extracted mapping for a UE and the area of interest, one or more 5GS entities.

21. The first network entity according to claim 1, wherein aggregating the obtained past association information for the area of interest utilizes a data repository service which supports queries for area of interest (AoI) context datasets.

* * * * *

UNITED STATES PATENT AND TRADEMARK OFFICE
CERTIFICATE OF CORRECTION

PATENT NO. : 12,177,075 B2
APPLICATION NO. : 17/856669
DATED : December 24, 2024
INVENTOR(S) : Marquezan et al.

It is certified that error appears in the above-identified patent and that said Letters Patent is hereby corrected as shown below:

In the Claims

Claim 13: Column 35, Line 3: "one or more Quality of Service (QOS) profile identifica-" should read as -- one or more Quality of Service (QoS) profile identifica- --.

Claim 20: Column 36, Line 31: "creating for the extracted AoI an AoI context record; and" should read as -- creating for the extracted AoI an AoI context record; and --.

Signed and Sealed this
Tenth Day of June, 2025

Coke Morgan Stewart
*Acting Director of the United States Patent and Trademark Office*